(12) United States Patent
Gauthier et al.

(10) Patent No.: US 10,467,634 B2
(45) Date of Patent: Nov. 5, 2019

(54) GENERATING METADATA AND VISUALS RELATED TO MINED DATA HABITS

(71) Applicant: SAP SE, Walldorf (DE)

(72) Inventors: Alain Gauthier, Montreal (CA);
Ghufran Iftikhar, Vaudreuil-Dorion (CA); Farid Toubal-Seghir, Laval (CA); Mohannad El-Jayousi, L'Ile-Bizard (CA); Rischa Poncik, Dorval (CA); Wanling Zhang, Montreal (CA); Roy Ghorayeb, Montreal (CA); James Zdralek, Montreal (CA)

(73) Assignee: SAP SE, Walldorf (DE)

( * ) Notice: Subject to any disclaimer, the term of this patent is extended or adjusted under 35 U.S.C. 154(b) by 927 days.

(21) Appl. No.: 14/821,476

(22) Filed: Aug. 7, 2015

(65) Prior Publication Data

US 2017/0039577 A1   Feb. 9, 2017

(51) Int. Cl.
*G06Q 30/02* (2012.01)
*G06F 16/26* (2019.01)
*G06F 16/9535* (2019.01)

(52) U.S. Cl.
CPC ......... *G06Q 30/0201* (2013.01); *G06F 16/26* (2019.01); *G06F 16/9535* (2019.01)

(58) Field of Classification Search
CPC .. G06Q 30/0201; G06F 16/26; G06F 16/9535
See application file for complete search history.

(56) References Cited

U.S. PATENT DOCUMENTS

| 8,650,492 B1* | 2/2014 | Mui | H04L 43/045 |
| | | | 715/736 |
| 9,021,361 B1* | 4/2015 | Pettinati | G06F 3/048 |
| | | | 715/736 |
| 2006/0010028 A1* | 1/2006 | Sorensen | G06Q 30/02 |
| | | | 705/7.34 |
| 2013/0226464 A1* | 8/2013 | Marci | A61B 5/16 |
| | | | 702/19 |
| 2015/0081701 A1* | 3/2015 | Lerios | H04L 43/045 |
| | | | 707/736 |
| 2016/0063072 A1* | 3/2016 | N | G06F 16/248 |
| | | | 707/722 |
| 2017/0098318 A1* | 4/2017 | Iannaccone | G06F 3/0485 |

* cited by examiner

*Primary Examiner* — Matthew S Gart
*Assistant Examiner* — Scott M Ross
(74) *Attorney, Agent, or Firm* — Jones Day

(57) ABSTRACT

Methods and systems of the present disclosure provide techniques for selectively providing mined customer data habits as source data to populate a Customer Journey as part of a Sankey diagram displayed on a User Interface. The mined customer data habits are selected for inclusion in the Customer Journey diagram according to at least one of: a user selection according to a mini-map; a modification based on metadata from a user selection; a modification of the available User Interface size according to a screen size; a recognition of content repetition in the Customer Journey; and an identification of sequential patterns as focus points in the Customer Journey diagram. In an embodiment, the method may automatically provide mined customer data habits to a predefined extent. The method may adapt a currently supplied miner customer data habit based on a user selection.

19 Claims, 22 Drawing Sheets

100

200

300

US 10,467,634 B2

GENERATING METADATA AND VISUALS RELATED TO MINED DATA HABITS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

CROSS-REFERENCE TO RELATED APPLICATIONS

This application is related to other concurrently-filed and commonly assigned applications, including:
U.S. patent application Ser. No. 14/821,465, entitled "Rendering Details From User Selections of Mined Data Habits";
U.S. patent application Ser. No. 14/821,332, entitled "Sankey Diagram Graphical User Interface Customization";
U.S. patent application Ser. No. 14/821,437, entitled "Building Business Objects Based on Sankey Diagram"; and
U.S. patent application Ser. No. 14/821,446, entitled "Simplification of Sankey Diagram".

FIELD

Methods, devices, and systems that relate to generation of a User Interface providing relevant data in a Sankey diagram regarding a journey over time according to mined data regarding the habits of the end user undertaking the journey; and in addition, to analysis of the relevant data presented in the Sankey diagram over the User Interface in a manner that supplements the experience of the user.

BACKGROUND

Most companies in both the service and goods industries foster relationships with the end users of their products and/or services. Such relationships may begin early on in the process, such as during a marketing campaign, and the relationships may continue for quite some time. Occasionally relationships with customers result in a customer purchase of a good and/or service. To provide quality customer relations, companies often track data related to the growth of customer relationships. For example, some companies track whether or not correspondence has been sent to a customer (e.g., a catalog and/or an email). Separately, some companies also track customer purchases over time and the customer's satisfaction with a good and/or service. For example, after a sale is completed some of these companies track customer satisfaction according to a customer's responses in a survey.

However, companies do not track, throughout the relationship between the customer and the company, the totality of the interactions. These companies, instead, segment their customer relations into separate marketing and customer satisfaction arenas. Accordingly, the companies fail to identify trends regarding the customer interactions and sales. Similarly, the companies fail to identify the relative success rates of trends from the interactions among specific demographics of customers.

Known visualization tools, implemented by these companies for reviewing the success of an interaction with a customer are cumbersome and difficult to readily interpret. Tables, containing large numbers entries regarding customer data (e.g., a customer's date of birth and their sales history), remain untransformed tables. Identifying and tracking trends among tables of categorized data or graphs of categorized data requires significant individual analysis and time.

Taking the time to interpret and analyze the categorized data stymies sales and the ability of the companies to recognize successful and unsuccessful trends in their respective customer relationships. Furthermore, the data presented in known visualization tools fails to acknowledge time relationships or hierarchical relationships that clearly exist in the interaction data. For example, the data presented does not acknowledge an interaction that occurs, in time, immediately before or immediately after the data under analysis in a table or graph.

Lag time between interactions, sales, and any analysis of the interactions further is detrimental to the companies. Information regarding the interactions is reviewed or considered relevant only after a sale is completed. Such information is culled, categorized, and only then transformed into a categorized graph and/or table for the review of the analytics team of the company. The slow analysis process of these companies further hinders their ability to quickly respond to trends in the customer interactions that could otherwise save the company money or generate additional revenue for the company.

Furthermore, the known visualization tools are simply tools that provide the data as is. After analysis of the data, the company or an employee might suggest that a portion of the represented data should be further analyzed according to specific criteria using a different tool. However, the time spent in recognition of a trend, in generation of interest in a possible data correlation, and in translation to the different tool for the analysis is again time lost that could instead be used to respond to identified trends in the marketplace.

Accordingly, a there is a need for a method, a system, and a visualization tool that is capable of selecting data for presentation in the visualization tool according to mined data regarding a customer's journey, including the customer's habits and characteristics, and dynamically presenting the selected data in an intuitive manner that further allows for analysis and additional contextual data inquiries.

DETAILED DESCRIPTION

Figure 1:
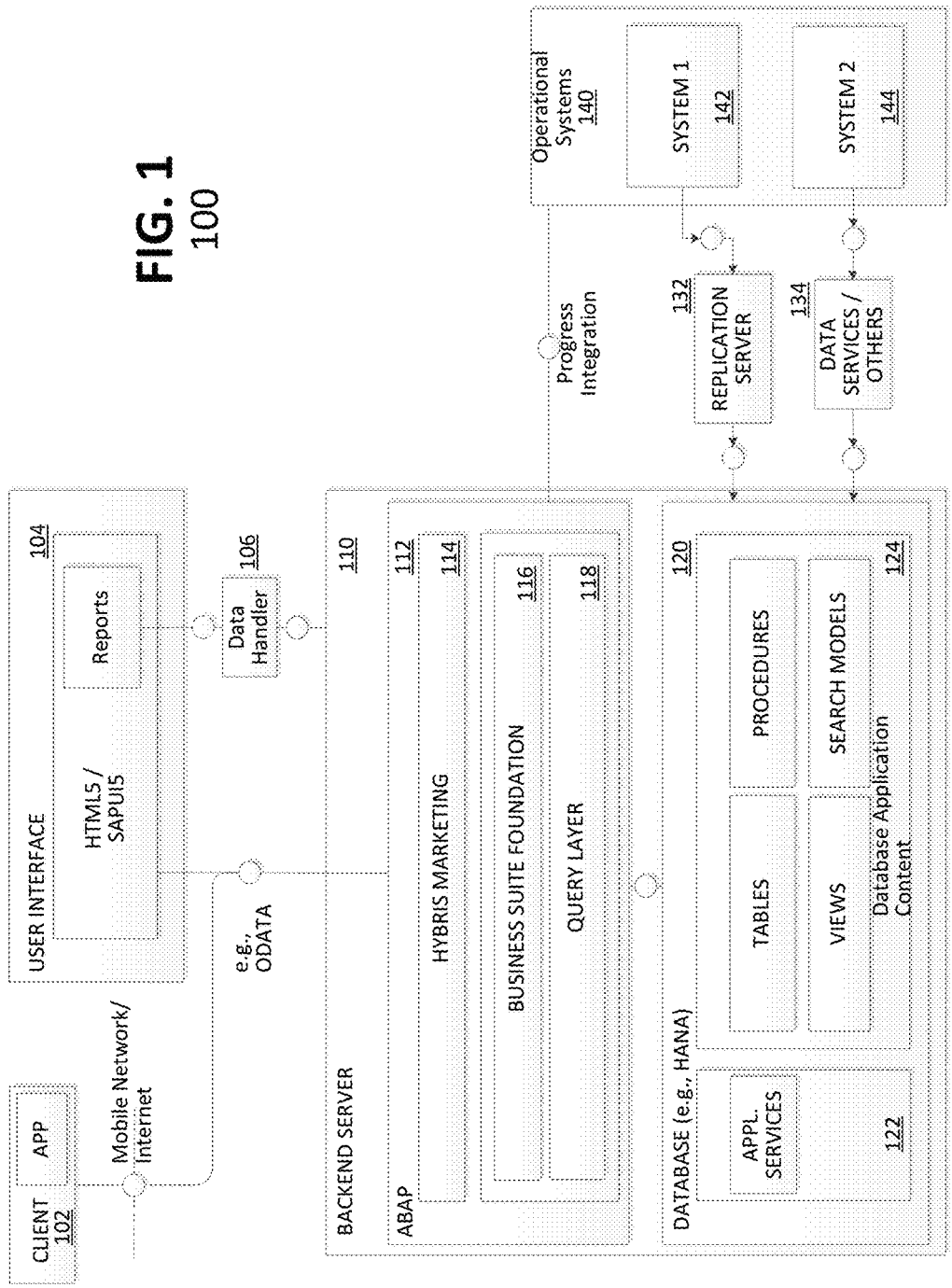
FIG. 1 is an illustration of an architectural overview of a networked system 100 that provides access to a database for embodiments of the present invention.

Example embodiments of the present invention provide for methods, devices, and systems for providing, for display in a user interface, relevant data regarding an end user journey through milestones according to mined data regarding the end user's habits; and, in addition, for analyzing the provided data over the user interface.

Although the present invention is often described with reference to marketing as a business context, it is to be understood that the applications of the current invention extend beyond the marketing industry and into other industries in which an end user has numerous interactions or milestones that can be tracked, stored, and analyzed by the system. The tracking and storage of the end user interactions and/or milestones are processed by the system to provide a high-level visual interpretation of a plurality of end user interactions. Information that would otherwise be presented in a table, and complex to analyze, is instead presented in a manner that allows for intuitive understanding of the trajectory of the end user interactions as well as the density of the end user interactions.

In order to provide clarity, the end users whose interactions and/or milestones are tracked are herein referred to as "customers" and the persons accessing the information regarding the customer experience are herein referred to as "users." Also to provide clarity, the interactions and/or milestones experienced by the customers are herein referred to as "Nodes." The Nodes describe the landmark experiences of the customers, and dense lines leading to or from a Node, and the sequence of Nodes may be significant to the user as is further described herein. The trajectory or the flow of the customer experience over time is herein referred to as a "path." The paths assist with the analysis of the customer experience over time, and amalgamations of paths are accordingly represented as larger, or dense, paths. Paths are, generally, provided as a linear function of time. Therefore, a path that, from left to right intersects with a first Node and then a second Node, refers to a customer interaction with the first Node at an earlier point in time than the time that the customer interacts with the second Node. A portion of a path that is uninterrupted between two Nodes is referred to as a "link." In some embodiments, the paths are combined in the form of a Sankey diagram, although other similar diagrams are considered incorporated herein.

The above described Nodes, paths, and links are generally depicted on a User Interface. The User Interface depicts a Customer Journey diagram, which in turn provides the relative relationship between the Nodes, paths, and links. In some embodiments, the Customer Journey diagram is in the form of, or includes, a Sankey diagram. Moreover, the User Interface provides the user with passive and interactive options in order to review the presented data. The user can interact with the User Interface by: modifying the filter criteria for the data presented in the Customer Journey diagram, analyzing via an action the data presented in the Customer Journey diagram, and performing additional functionality as is described in greater detail according to the following description. The user can passively view additional contextual data related to the data presented in the Customer Journey diagram and observe additional functionality from the data presented in the Customer Journey diagram as is described in greater detail according to the following description. The User Interface interacts with a backend server, and overall the User Interface, the backend server, and any necessary intermediary servers form a system for analyzing and presenting the stored customer habits. According to an example embodiment, the data available on the backend server is updated in real time and similarly, the User Interface is able to be updated in real time. In some embodiments, regardless of the update timing associated with the backend server, the User Interface is capable of responding to and firing queries in real time such that the data maintained on the display of the User Interface is as complete as possible. The responses to the queries are returned to the device associated with the User Interface, and the responses are interpreted and rendered into the above described visual form in the Customer Journey diagrams.

The Customer Journey diagram, presented on the User Interface, is not merely a graphical representation. The system further, including the backend server, generates "metadata" that shows the relations between the customer interaction records based on time. Metadata related to the sequence of customer interactions is not exactly stored as such in the database. Instead, the database stores the core data and Customer Journey diagram build instructions that transform the mined data habits, including the customer interactions, into a visualization of the records. The transformation of the data involves at least computation of the involved paths and aggregation of the collective paths into the Customer Journey diagram. The path aggregation and presentation allows for decision making based on a critical mass of information.

FIG. 1 is a system diagram depicting an architectural overview of a networked system 100 suitable for use with embodiments of the present invention. As shown in FIG. 1, the networked system 100 includes client device 102, user interface server 104, and backend server 110.

The networked system 100 includes one or more client devices 102, being network accessible via an Internet connection, and connected to a backend server 110. Client device 102 may include a variety of devices such as, for example, a mobile device (e.g., mobile phone or smartphone), a personal computer, a laptop, a tablet, and the like. In addition, client device 102 may host one or more client applications, such as a client journey application.

A client journey application may mine large amounts of user interaction data stored within data sources 120 of backend server 110. The client journey application may utilize such user interaction data to provide and graphically render trends in user interactions for a respective business product according to the methods described herein. For example, when many users buy a product, the client journey application may graphically render various channels (also referred to as paths or links) that customers traverse to purchase the given product. The various purchasing channels and their respective frequencies (e.g., a frequency of use) may be mined from data sources 120, and graphically rendered by a client device 102 of networked system 100.

Client device 102 and user interface server 104 may be configured to exchange data with an enterprise data system, such as a backend server 110. In some embodiments, data is exchanged via data handler 106. User interface server 104 may utilize a variety of interfaced technologies. Some example interface technologies include HTML5, SAP® UI5, SAP®-WebDynpro, SAP® Gui, Perl, and the like. In addition, the user interface technology may operate in conjunction with business object platforms for visualizing business objects, such as SAP® Business Object Platform (SBOP), SAP® Business Intelligence Platform (SBIP), and the like.

User interface server 104 may generate interface code at runtime. However, depending on the interface technology, some embodiments may implement functions of the user interface server 104 on the client-side. For example, functions of the user interface server 104 may be implemented at the client device 102 on a browser using HTML5, javascript, CSS, or on a device using ObjectiveC. Thus, in some implementations, implementation of user interface server 104 may be optional.

The backend server 110 may be configured to process request(s), retrieve data, and/or perform data operations as an appropriate response to a request, and return a response for transmission back to the client device 102 or user interface server 104. In the example configuration depicted in FIG. 1, the backend server 110 may include one or more advanced business application programming (ABAP) modules 112, such as marketing module 114, which may be a Hybris® marketing module. For example, hybris marketing module 114 may be configured to track and store user interactions, such as user shopping history, product browsing history, purchase history, and associated product information. In some instances, hybris marketing module 114 may be further configured to track and store a particular user's interactions across multiple devices of the user. ABAP modules 112 may further include additional modules, such as business suite foundation module 116 and query layer 118 that may be configured to facilitate the exchange of data between the hybris marketing module 114 and database 120.

The backend server 110 may further include one or more data sources 120. In the example depicted in FIG. 100, data source 120 may include application support modules 122 and database content 124 that may include a variety of tables, views, search models, search procedures, and the like. In addition to internal data sources 120, backend server 110 may further be coupled to a variety of external data sources 140. For example, external systems 142 and 144 may be coupled to the backend server 110 via replication server 132 and/or other data services 134, respectively. In some embodiments, backend server is connected to external data sources via progress integration. By forming the connection via progress integration, data sources can be updated or overhauled without stalling or hindering data analysis and path aggregation.

Some example external data sources may include transactional information such as contact information, sales activities, quotations, and sales orders from CRM (customer relationship management) and ERP (enterprise resource planning) systems. In some instances, the backend server 110 may aggregate data from multiple backend servers. Within backend server 110, a variety of data, may be quickly aggregated without compromising backend or overall system performance. In some instances, various data may be represented using virtual data models (VDMs) to enable faster data aggregation. Here, a plurality of VDMs may be aggregated into fewer, or even a single VDM. Thus, aggregated data may be presented along one or more displays of a client journey application.

In addition, the backend server 110 may be implemented by or coupled to an in-memory database. In-memory databases are located within the main memory of a computer system or a coupled device, which provides the advantage of faster data access and faster program execution. In-memory databases also enable real-time operation on a computer or device, or on multiple computers or devices communicating through wired or network connections. An example of an in-memory database is the SAP® high-performance analytic appliance (HANA®). However, the embodiments are not limited to any particular in-memory database technology.

The various components networked system 100, such as client device 102, user interface server 104, and backend server 110, may be connected using known and expected network technologies, such as an Internet connection. In another example, a data handler 106 may be configured to exchange data between user interface server 104 and backend server 110. Here, the data handler 106 may include SBOP (SAP Business Objects Platform) and SBIP functions.

Figure 2:
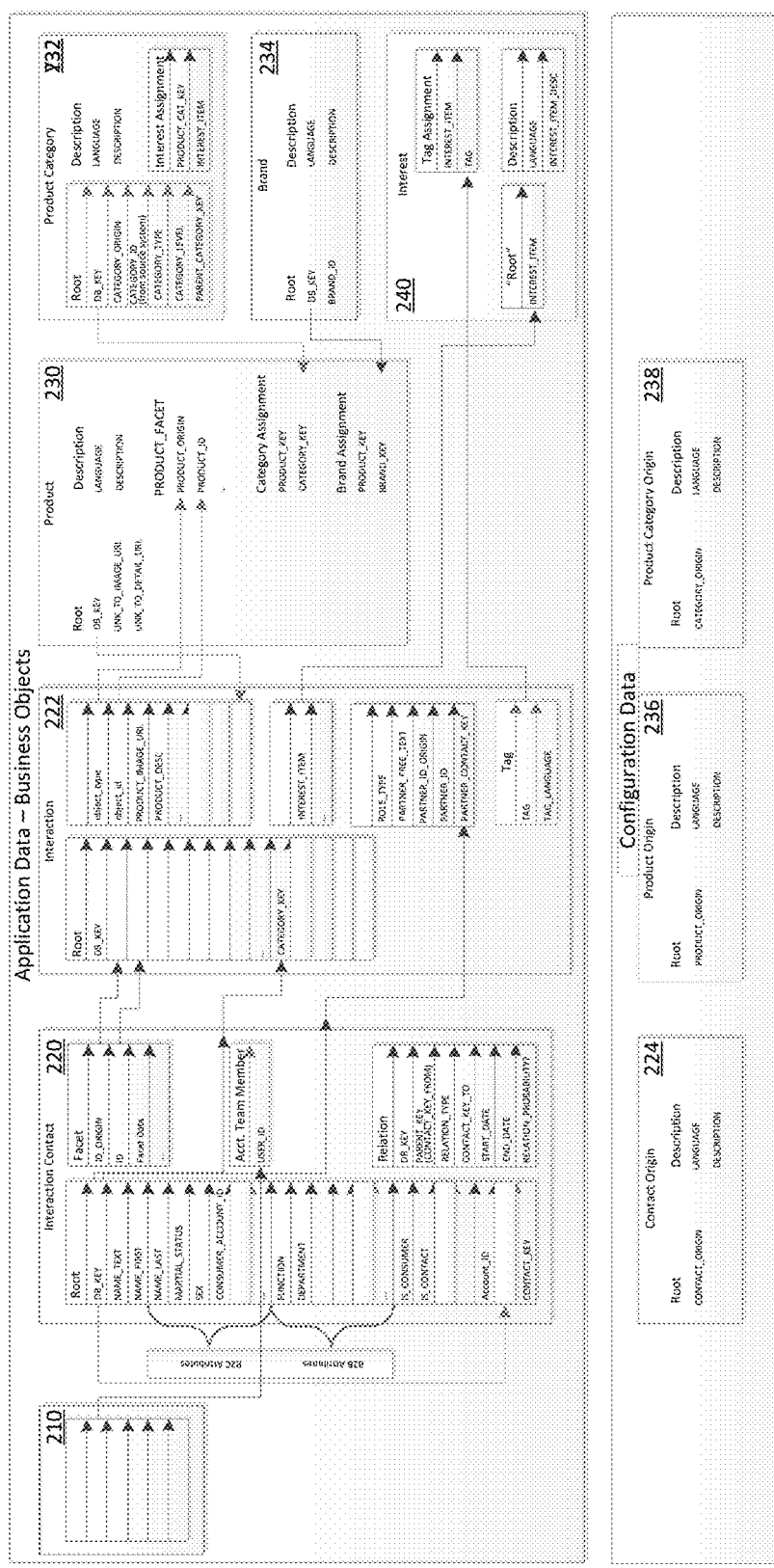
FIG. 2 is an illustration of an architectural overview of a database 200 according to an example embodiment of the present invention.

FIG. 2 is a block diagram depicting an architectural overview of a database 200 according to an example embodiment of the present invention. As shown in FIG. 2, the database includes a plurality of application and configuration data tables that may be used to track and store user interactions (e.g., user shopping history, product browsing history, purchase history, and associated product information). Example application data tables include user table 210, interaction contact table 220, interaction table 222, product table 230, product category table 232, brand table 234, and interests table 240. In addition, example configuration tables include contact origin table 224, product origin table 236, and product category origin table 238.

Figure 3:
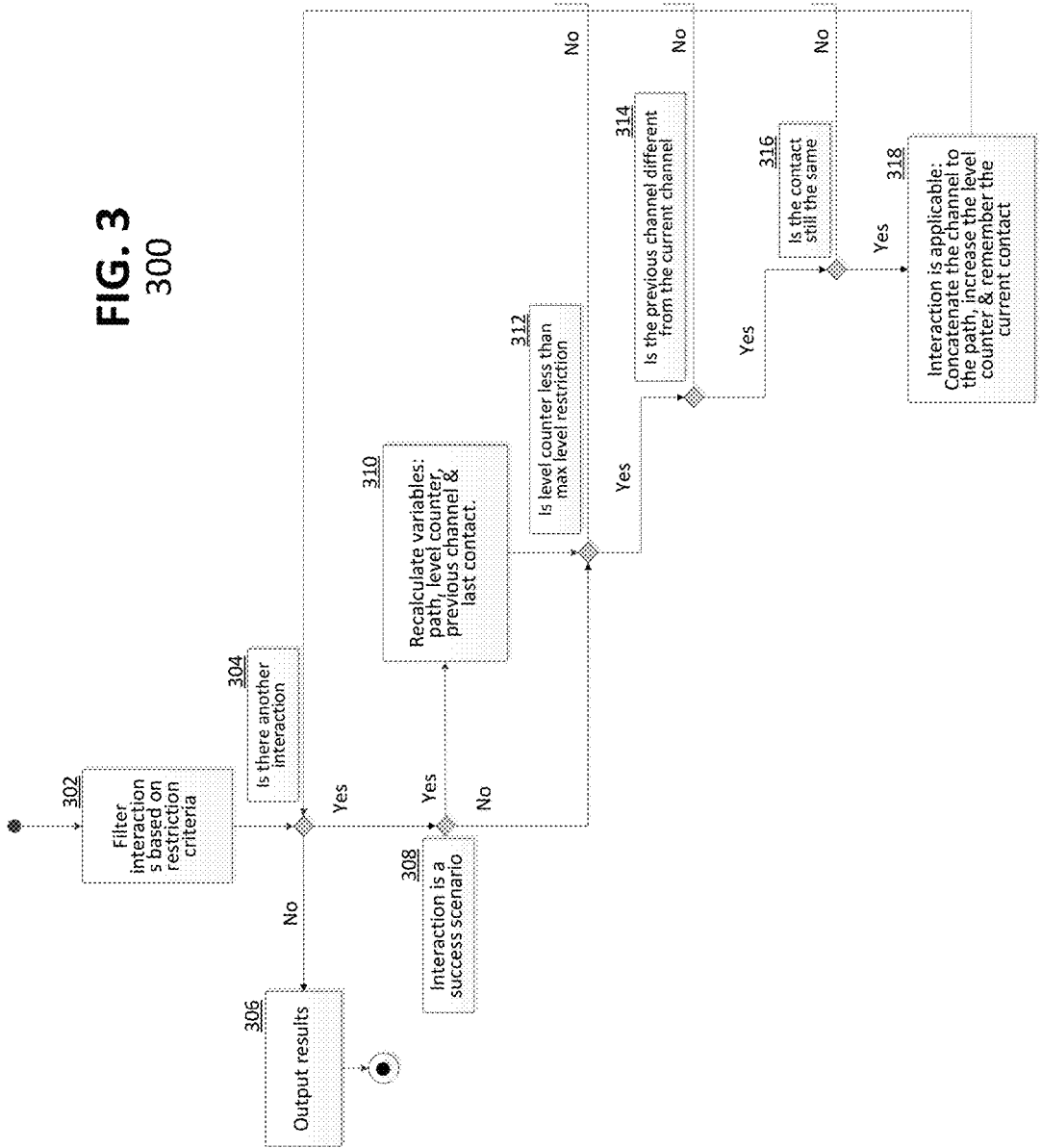
FIG. 3 is an illustration of a method 300 for mining a database according to an example embodiment of the present invention.

FIG. 3 illustrates a method 300 for mining a database according to an example embodiment of the present invention. At the outset, a user of the client device may filter interactions based on restriction criteria, at 302. For example, restriction criteria may include a particular product, product category, group of products, particular brand, and/or the like.

Next, at 304, the method 300 determines whether another respective interaction has occurred. Here, the method 300 may periodically determine whether other respective interactions have occurred. Alternatively, step 304 may be triggered by a change to one of the data sources. If no other respective interactions have occurred, the method 300 may proceed to output search results, at 306. As discussed above, the search results may be supplied to a requesting user interface server and/or client device. If another respective interaction has occurred, the method 300 may proceed to 308.

At 308, the method 300 determines whether the respective interaction is a success scenario (e.g., purchase of a product). If the respective interaction is a success scenario, one or more variables (e.g., path, level counter, previous channel, last contact, and/or the like) used for graphically rendering the user interaction data may be recalculated at 310. In an embodiment, after the recalculation, the method 300 may proceed to steps 312-316. In an embodiment, if the interaction is not a success scenario, the method 300 may proceed to steps 312-316.

At step 312, the level counter variable may be compared to a maximum level restriction. For example, the comparison of the level counter to a maximum level restriction may be used to ensure that a frequently traversed journey does not visually obstruct other journeys, if graphically rendered. If the level counter is not less than a maximum level restriction, the method 300 may proceed to output results, at 306. On the other hand, if the level counter is less than a maximum level restriction, the method 300 may proceed to 314.

At 314, the method 300 determines whether a respective interaction has changed channels. In other words, the method 300 determines whether the previous channel of the respective interaction is the same as its current channel. If the channel has not changed, the method 300 may proceed to output results, at 306. On the other hand, if the channel has changed, the method 300 may proceed to 316.

At 316, the method 300 determines whether contact information for the respective interaction has changed. If the contact information has not changed, the method 300 may proceed to output results, at 306. On the other hand, if the contact information has changed, the method 300 may proceed to 318. At 318, the method 300 may concatenate the channel to the path, increase the level counter, and/or store contact information. The method 300 may then proceed to output results at 306.

The User Interface is generated in a manner to provide a straightforward display representative of the selectively mined customer data habits. The user experience and the intuitiveness of the display of the selectively mined customer data habits are supported by the manner in which the data is selected to populate the Customer Journey diagrams of the User Interface. The selection of data to populate the Customer Journey diagrams is beneficially performed according to at least one of: utilization of mini-maps for selection of the data; flexible modification according to a metadata selection; structurization of the diagram according to the device and/or screen size of the User Interface; recognition and usage of content repetition for filtering; and identification of sequential patterns as focus points.

Journey Diagram Mini-Map or Graph

In order to provide for a straightforward user experience, the User Interface provides several different navigation techniques. The Customer Journey is provided across a full screen. As the Customer Journey experience provides large amounts of data, specifically the flow of customer engagement at different Nodes, a user may be interested in viewing different, or specific, portions of the Customer Journey. In some circumstances, a user may not, in fact, know which particular details of the Customer Journey are most useful, and therefore desire an environment in which the user can quickly, using visuals, determine the most pertinent portion of the Customer Journey and navigate there accordingly.

In order to do so, in some embodiments the Customer Journey is visible in two parts: a first part and a second part. In a first part, the Customer Journey includes a detailed portion of the Customer Journey. In a second part, the Customer Journey includes a, relative to the first part, smaller Customer Journey that provides the full extent of the Customer Journey. In some embodiments, the diagram presentation of the Customer Journey only includes the first part. The second part of the Customer Journey diagram may further be referred to as a mini-map or a mini graph.

The first part of the Customer Journey is rendered to provide the user with at least some of the paths that describe the customer experience. In a default setting, the first part of the Customer Journey includes the full extent of all of the Customer Journey. In another example embodiment, for the default setting the first part of the Customer Journey includes the most recent portion of the Customer Journey. In some example embodiments, the default provided first part of the Customer Journey is set to filter with respect to a particular KPI. To provide the data that populates the Customer Journey, the system queries the backend for relevant data, and the response from the query is used to render the first part of the Customer Journey. In some embodiments, filter values are entered to limit the amount of data regarding which the system queries the backend. In other example embodiments, only after a first part of the Customer Journey is rendered are the filter values eligible to limit a new amount of data regarding which the system queries the backend. Filter values used to limit the backend queries can vary according to the relevant data set. In an example embodiment, the filter values include: a date, a date range, an event, an event type, a type of customer, touch points, top journeys, journeys that resulted in a sale/buy, amount of purchase, purchase type, and other criteria commonly known to one of ordinary skill in the art.

The second part of the Customer Journey is rendered to provide the user with a total view of the Customer Journey. The second part of the Customer Journey provides the user with a preliminary result or an overview. The second part of the Customer Journey can be presented according to any variable of interest, over time, of the Customer Journey. In some embodiments, the variable of interest is a KPI. In other embodiments, the variable of interest is a type of customer, an amount of purchase, a purchase type, a Customer Journey diagram, top journeys, journeys that resulted in a sale/buy, and other criteria commonly known to one of ordinary skill in the art. The second part of the Customer Journey is, according to some example embodiments, provided only as a visual cue. In other example embodiments, the second part of the Customer Journey provides the user with control to set the range of the first part of the Customer Journey. For example, the second part of the Customer Journey includes a slider bar or a slider range control that enables the user to mark, on the second part of the Customer Journey, the extent of time which is to be shown on the first part of the Customer Journey. After the slider bar or slider range control is adjusted, in an example embodiment, the first part of the Customer Journey is automatically updated because a query associated with the adjusted range is fired to the backend for the associated data. The response from the query is then used to update the first part of the Customer Journey. According to another example embodiment, the first part of the Customer Journey is updated based on the slider bar or the slider range control on the second part of the Customer Journey only after the user has selected a button or an icon.

Figure 4A:
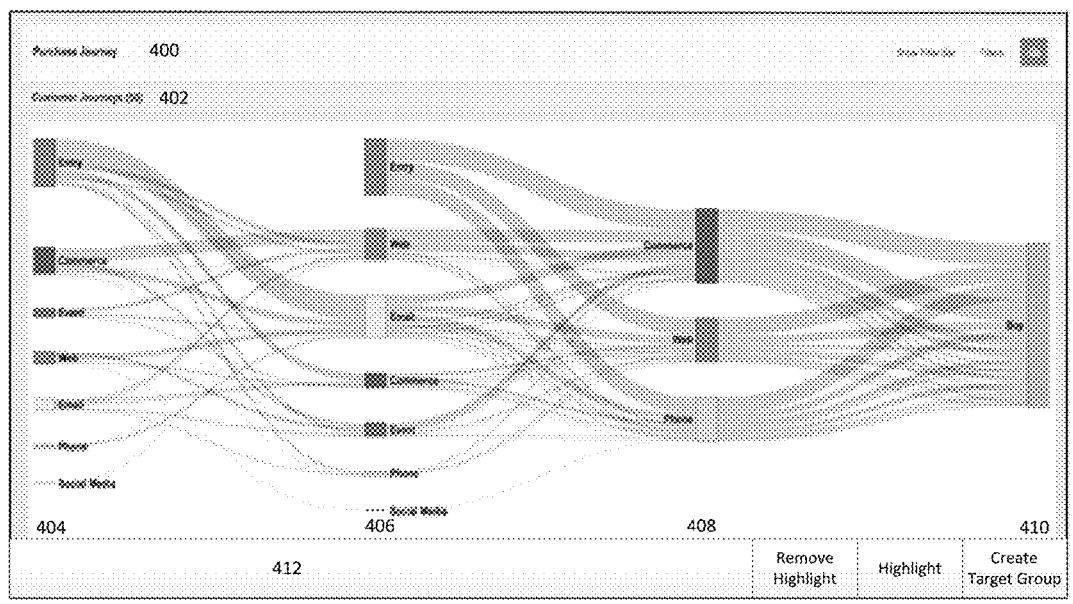
FIG. 4A is an illustration of a Customer Journey 400 that includes only the first part of the Customer Journey.

FIG. 4A is an illustration of a Customer Journey 400 that includes only the first part of the Customer Journey. In the embodiment shown, the Customer Journey is described as a Purchase Journey 400. The specific portion of the overall Customer Journey provides the interaction of various customers over four different levels: Level One 404, Level Two 406, Level Three 408, and Level Four 410. On Level One 404, the Customer Journey is provided for several Nodes including: Entry, Commerce, Event, Web, Email, Phone, and Social Media. On Level Two 406, the Customer Journey is provided for several Nodes including: Entry, Web, Email, Commerce, Event, Phone, and Social Media. On Level Three 408, the Customer Journey is provided for Commerce, Web, and Phone. On Level Four 410, the Customer Journey is provided for Buy. The total number of paths included in the Customer Journey is shown at 402 as 50 paths. To further interact with the Customer Journey, the user may manipulate the dashboard 412. In an example embodiment, the Customer Journey 402 is rendered according to a default presentation setting of the system.

Figure 4B:
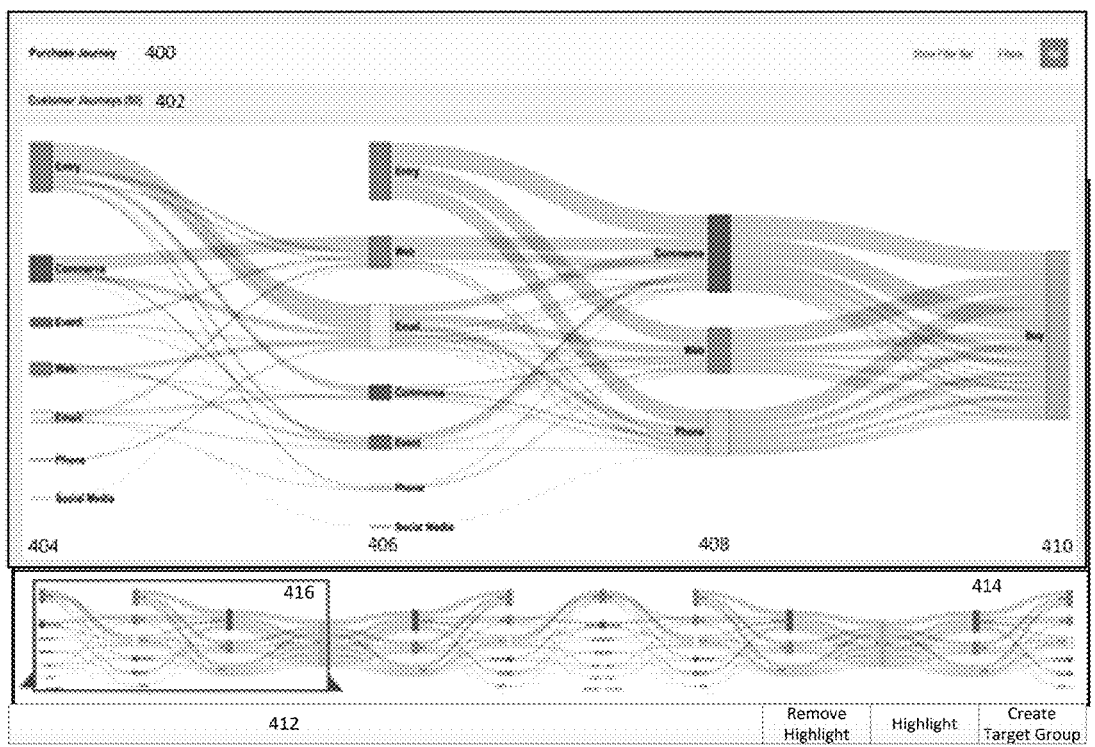
FIG. 4B is an illustration of a Customer Journey 400 that includes both the first part of the Customer Journey and the second part of the Customer Journey as a mini-map.

FIG. 4B is an illustration of a Customer Journey 400 that includes both the first part of the Customer Journey and the second part of the Customer Journey as a mini-map. In the embodiment shown, the Customer Journey is described as a Purchase Journey 400. The total number of paths included in the first part of the Customer Journey is shown at 402 as 50 paths. Beneath the first part of the Customer Journey is a mini-map of the overall Customer Journey shown as 414. The mini-map 414 includes the slider box 416, which is currently shown as selecting a four level portion of the overall Customer Journey. The four level portion of the overall Customer Journey dictates the limited selection rendered in the first part of the Customer Journey. By viewing the mini-map 414 of the overall Purchase Journey, the user can determine the most relevant or important section of the Purchase Journey and select the region for a more detailed view and/or analysis in the first part of the Customer Journey. In the embodiment shown, the mini-map 414 includes Purchase Journeys as a function of time.

Figure 4C:
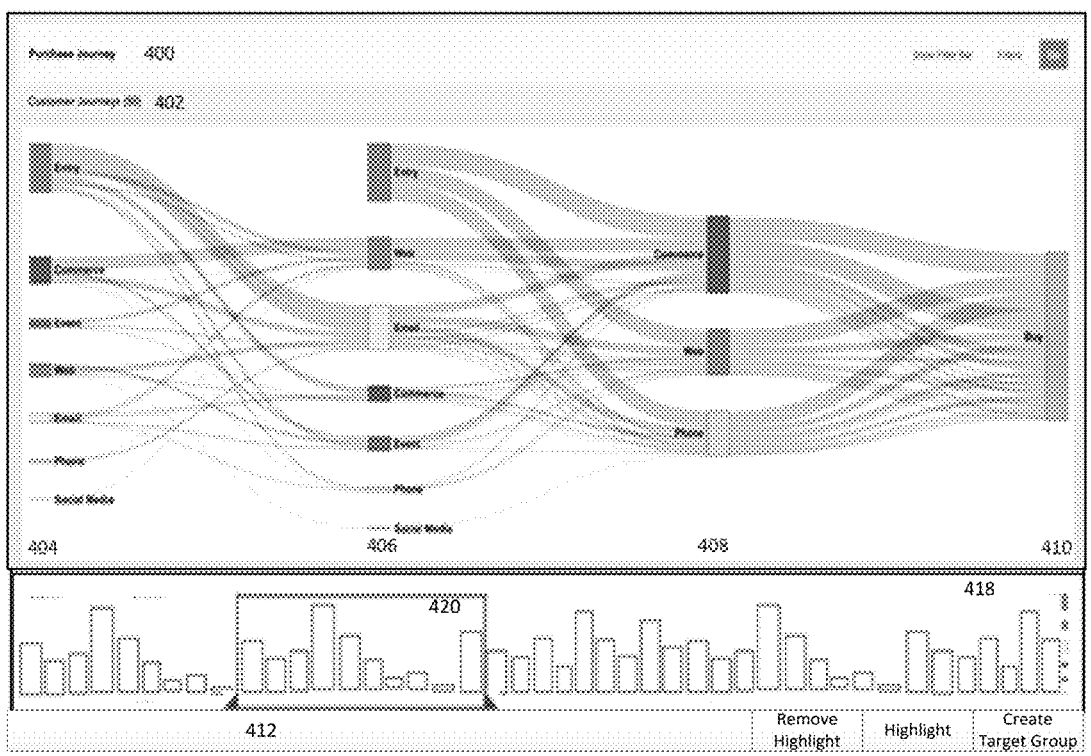
FIG. 4C is an illustration of a Customer Journey 400 that includes another example having both the first part of the Customer Journey and a second part of the Customer Journey as a mini-map.

FIG. 4C is an illustration of a Customer Journey 400 that includes another example having both the first part of the Customer Journey and a second part of the Customer Journey as a mini-map. In the embodiment shown, the Customer Journey is described as a Purchase Journey 400. The total number of paths included in the first part of the Customer Journey is shown at 402 as 50 paths. Beneath the first part of the Customer Journey is a mini-map of the overall Customer Journey shown as 418. The mini-map 418 includes the slider box 420, which is currently shown as selecting a portion of the overall Customer Journey. The selected portion of the overall Customer Journey dictates the limited selection rendered in the first part of the Customer Journey. By viewing the mini-map 418 of the overall Purchase Journey, the user can determine the most relevant or important section of the Purchase Journey and select the region for a more detailed view and/or analysis in the first part of the Customer Journey. In the embodiment shown, the mini-map 418 includes a degree of success of a KPI as a function of time. Specifically, the embodiment shown includes the amount of purchases made as a function of time. The selection of an area of the mini-map renders the associated Customer Journey in the first part of the Customer Journey diagram.

Figure 5:
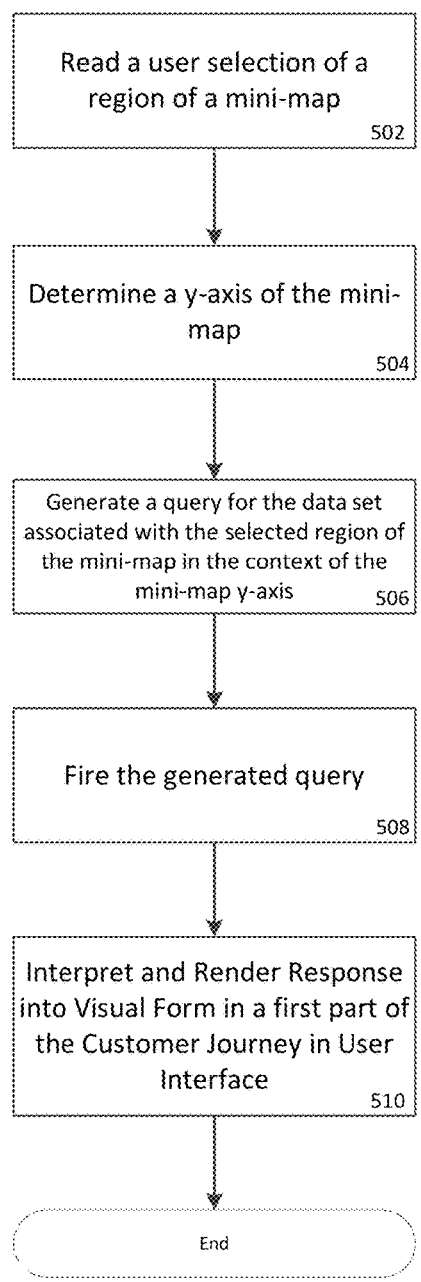
FIG. 5 illustrates a flowchart 500 that describes the process to render the first part of the Customer Journey according to a user selection of a region of a mini-map.

FIG. 5 illustrates a flowchart 500 that describes the process to render the first part of the Customer Journey according to a user selection of a region of a mini-map. First, at 502, upon the User's selection of a region of a mini-map, which is generated by one of a slider box or slider bar, the system retrieves the information regarding the user's selection. In some embodiments, the retrieved user selection is stored as an entry in an associated saved mini-map searches table. At 504, the system determines the y-axis of the mini-map that was presented to the user during the user selection of a region of the mini-map. At 506, the system generates a query for the data set associated with the selected region of the mini-map and according to the y-axis of the mini-map. In some embodiments, the generated query is stored in the saved mini-map searches table. At 508, the generated query is fired. After the query is fired, the system receives a response which it interprets and renders into visual form in a first part of the Customer Journey in accordance with 510.

Update Journey Diagram Based on Meta Data Selection

In order to provide for a straightforward user experience, the User Interface is dynamically updated based on metadata selections of the user. In some example embodiments, the metadata selection of the user is qualified as the Nodes viewed, or the Nodes selected, by the user. Only the selected Nodes are represented in the diagram, and the data flow remains uninterrupted when the Customer Journey includes the unselected Nodes.

In order to do so, in some embodiments the metadata selections require that a particular Node is removed from the Customer Journey to the users. Furthermore, in some embodiments, the metadata selections require the addition of a particular Node for display in the Customer Journey to the users. When a Node is removed from the Customer Journey, the Node immediately prior to the removed Node is connected, via a path, to the Node immediately following the removed Node. If the Node to be removed is the first Node, the subsequent Node becomes the first Node. If the Node to be removed is the last Node, then the Node immediately prior becomes the last Node. When a Node is added to the middle of a data flow in a Customer Journey, two adjacent Nodes become separated by the new Node. When a Node is added to the beginning of a data flow in a Customer Journey, the new Node becomes the first, or Level One, Node for that data flow. When a Node is added to the end of a data flow in a Customer Journey, the new Node becomes the last, or last Level, Node for that data flow.

Addition or removal of a Node in the Customer Journey according to the metadata can occur for a variety of reasons. In some example embodiments, the user has changed the filter criteria for the Customer Journey on display. Addition or removal of a Node may further be necessary based on a selection of a data range using one of a slider bar or slider range on a second part of a Customer Journey. Similarly, the Node changes may be necessary according to removal of a specific path or paths by manual selection. When data is unreliable, and the system determines that the dynamically retrieved data is corrupted, it also may not be reported as a Node. When a minimal amount of data relates to a Node or the amount of data available for a Node is below a threshold value, the minimal amount of data can be ignored and removal of a Node is performed. If the system is dynamically retrieving responses to queries to the backend in real-time, and the system is reporting the real-time response on the Customer Journey, then a rapid change in a data response can furthermore result in a removal of a Node in the Customer Journey.

For example, a Customer Journey may include four user groups, each following a different path. For example, User Group A follows the path: Commerce→Web→Commerce→Buy. User Group B follows the path: Event→Web→Commerce→Buy. User Group C follows the path: Web→Event→Commerce→Buy. User Group D follows the path: Phone→Commerce→Buy. An initial overall Customer Journey includes all of the Nodes from User Group A, User Group B, User Group C, and User Group D: Commerce Level One, Commerce Level Three, Event Level One, Event Level Two, Web Level One, Web Level Two, Phone Level Two, and Buy. In this example, a user may filter the Customer Journey such that User Group C is eliminated from the total pool of data. Accordingly, Nodes may be removed including Web Level One and Event Level Two. In the same example, an update to the data pool may, with the same filter credentials, introduce a new User Group E. With the addition of User Group E, the Customer Journey Node set can expand to include additional Nodes from User Group E.

Figure 6A:
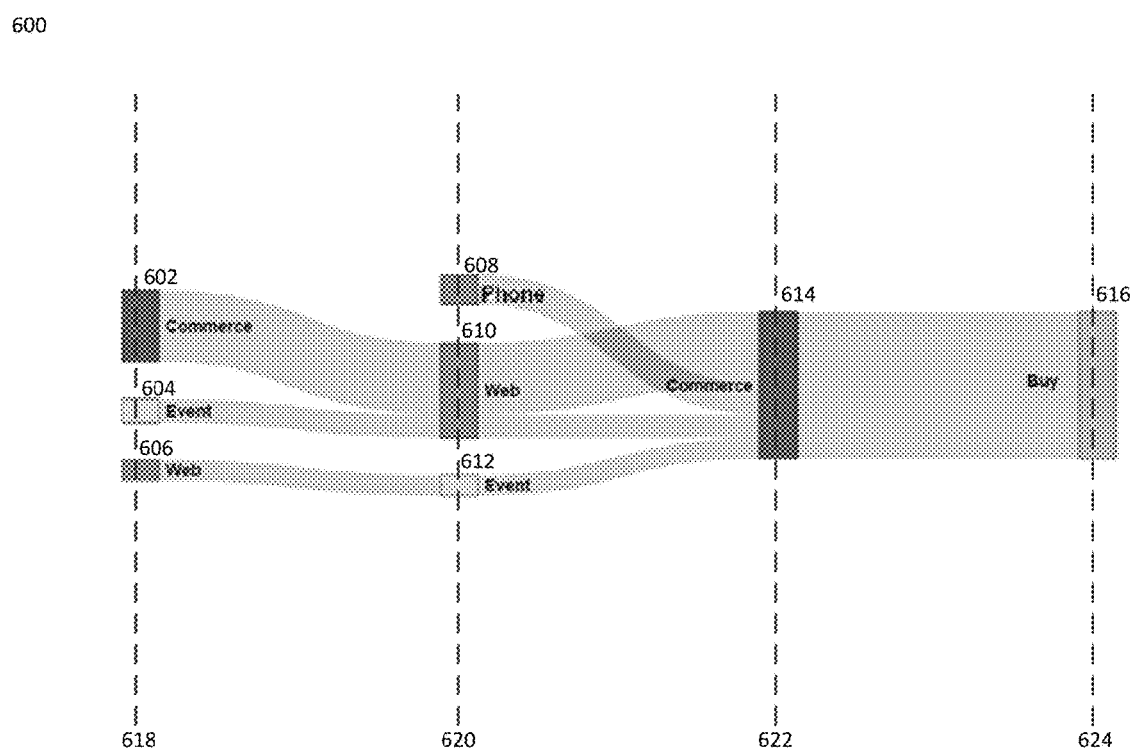
FIG. 6A illustrates an example embodiment of a Customer Journey 600 over a set of Nodes configured to update according to an initial user metadata selection.

FIG. 6A illustrates an example embodiment of a Customer Journey over a set of Nodes based on an initial user metadata selection. FIG. 6A includes the four above described user paths: User Group A, User Group B, User Group C, and User Group D. Therefore, four different levels of Nodes are provided: Level One 618, Level Two 620, Level Three 622, and Level Four 624. Level One 618 includes Nodes for: Commerce 602, Event 604, and Web 606. Level Two 620 includes Nodes for: Phone 608, Web 610, and Event 612. Level Three 622 includes Nodes for: Commerce 614. Level Four 624 includes Nodes for: Buy 616. Accordingly, based on an initial user selection or a default presentation of the Customer Journey, the diagram presents users in User Group A interacting with Nodes 602, 610, 614, and 616. The diagram further presents users in User Group B interacting with Nodes 604, 610, 614, and 616, and users in User Group C interacting with Nodes 606, 612, 614, and 616. User Group D is described as interacting with Nodes 608, 614, and 616.

Figure 6B:
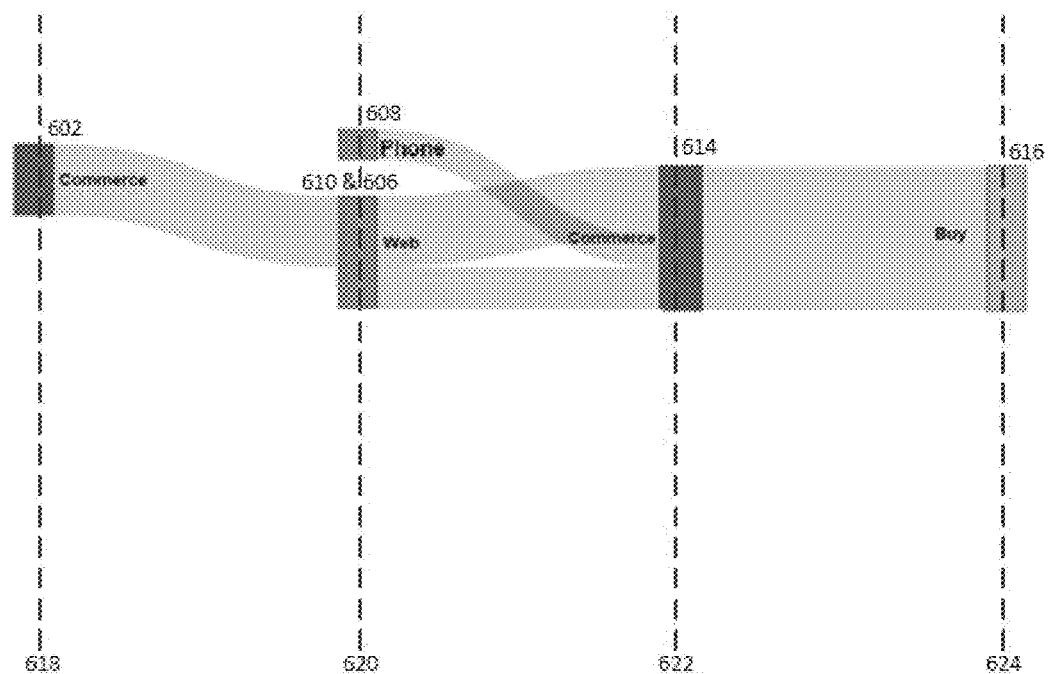
FIG. 6B illustrates an example embodiment of a Customer Journey 600 over an altered set of Nodes based on an updated user metadata selection.

FIG. 6B illustrates an example embodiment of a Customer Journey over an altered set of Nodes based on an updated user metadata selection. FIG. 6B is the Customer Journey diagram that would be provided after the user has made a change that alters the metadata source for the Customer Journey. The altered set of Nodes in FIG. 6B, as compared to FIG. 6A, includes fewer Nodes as one was removed due to a change in the metadata. Nodes 604 and 612 are no longer included in the Customer Journey diagram. Node 604, which occurred at Level One 618, and Node 612, which occurred at Level Two 620, could be removed for a variety of reasons. Node 604 was included in User Group B, and Node 612 was included in User Group C. Nodes 604 may be removed due to a lack of statistically significant data for that particular Node in the User Group B data. Similarly, Node 612 may be removed due to an indication that the data available for that particular Node in the User Group C data is corrupted. Once node 612 is removed, node 606 is restructured at level 620. Provided that in a Customer Journey, only one unique node is available per level, node 606 and node 610 have merged.

Figure 6C:
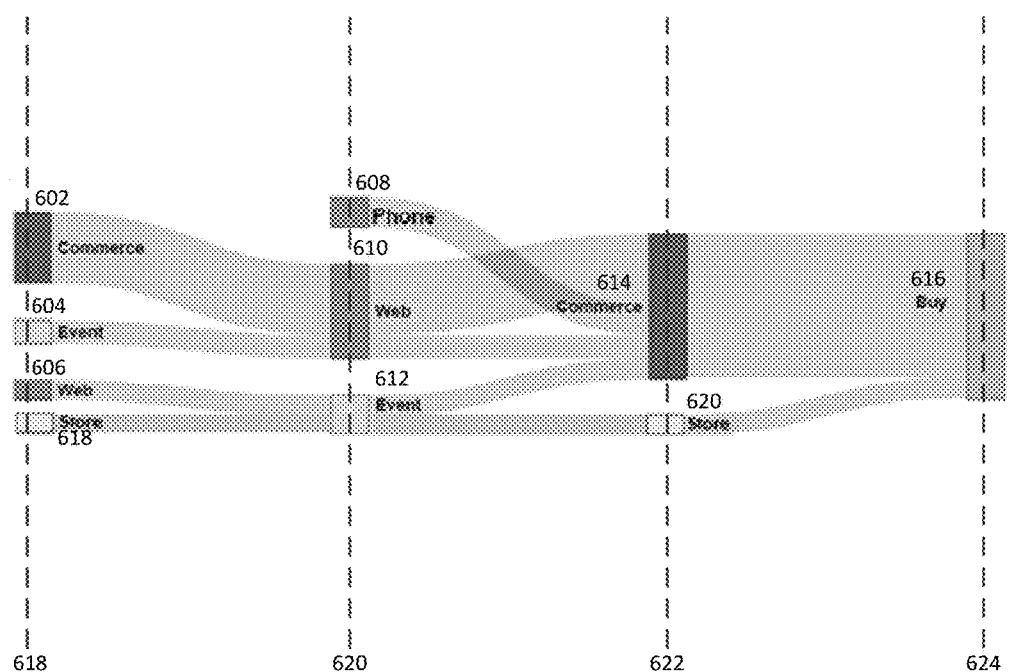
FIG. 6C illustrates an example embodiment of a Customer Journey 600 over an other altered set of Nodes based on an updated user metadata selection.

FIG. 6C illustrates an example embodiment of a Customer Journey over an other altered set of Nodes based on an updated user metadata selection. FIG. 6C is the Customer Journey diagram that would be provided after the user has made a change that alters the metadata source for the Customer Journey. The altered set of Nodes in FIG. 6C, as compared to FIG. 6A, includes additional Nodes due to a change in the metadata. Nodes 618 and 620 are newly added to the Customer Journey diagram. Node 618 describes an interaction at Level One 618 with a Store, and Node 620 describes an interaction at Level Three 622 with a Store. Nodes 618 and 620 could be added for a variety of reasons. In some example embodiments, a statistically significant portion of a customer group aligned with the Node. In another example embodiment, a new user group was added to the data to be viewed based on a user interaction with a filter bar. A user may have changed a filter criteria such that a new User Group E was included in the Customer Journey. User Group E could include the customer group interacting with Nodes 618, 612, 620, and 616.

Figure 7:
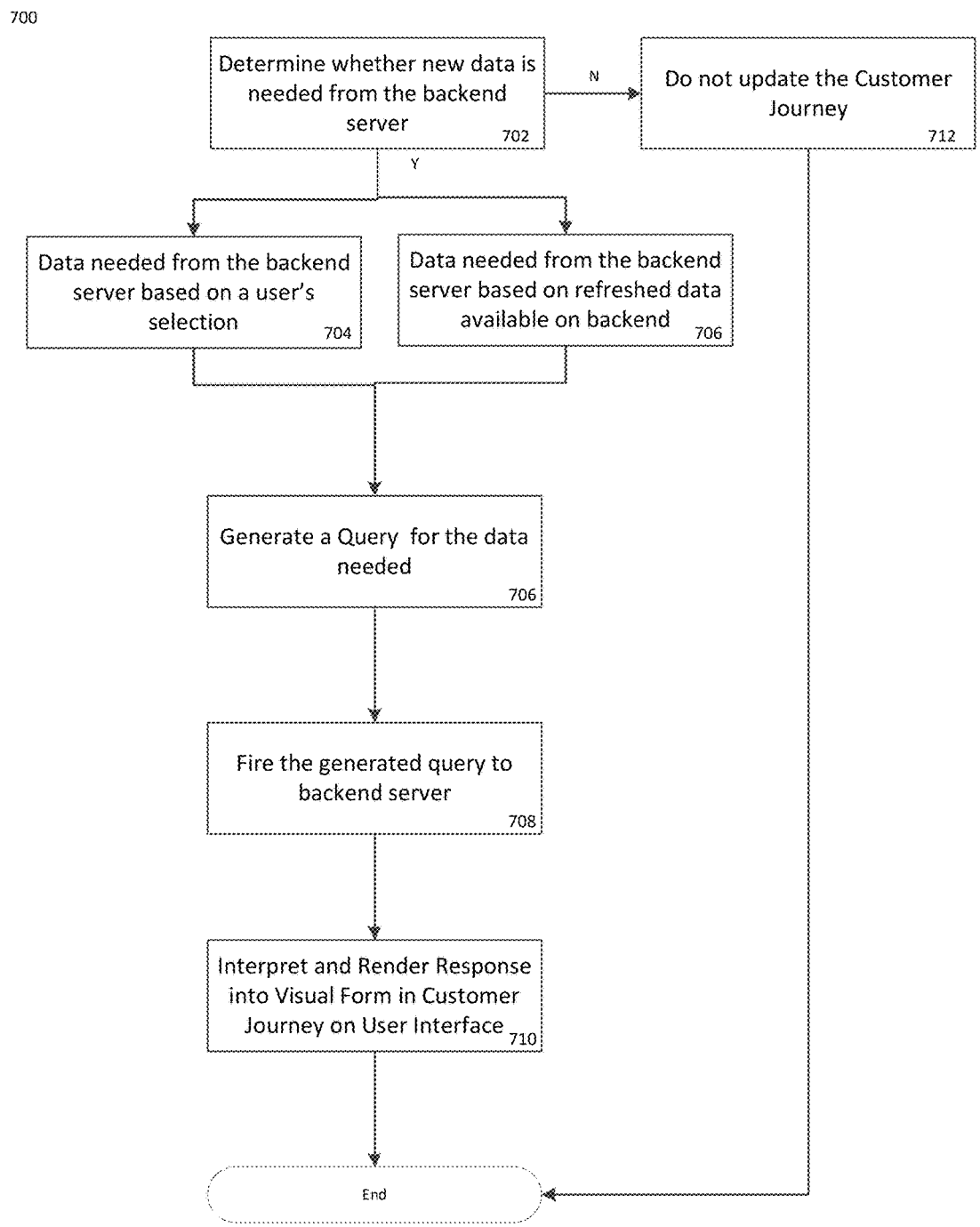
FIG. 7 illustrates a flowchart 700 that describes an example process to render the Customer Journey according to a user selection that alters the metadata of the Customer Journey.

FIG. 7 illustrates a flowchart 700 that describes an example process to render the Customer Journey according to a user selection that alters the metadata of the Customer Journey. First, at 702, it is determined whether it is necessary to copy any new data from the backend server to another server. As an example embodiment, the determination may be based upon a User's selection that varies the supplied metadata as described in 704, or upon a change in the supplied source data for the User's current selection as described in 706. If the determination indicates, from the metadata, that data is needed to update the Customer Journey, the process continues according to 704. In 704 and 706, it is determined what specific data is needed to update the Customer Journey. In some example embodiments, 706 is completed prior to 704. In other example embodiments, 704 is completed prior to 706. In some example embodiments, 704 and 706 are processed at the same time. At 706, the system generates a query for the data needed based on either 704, 706, or both 704 and 706. In some embodiments, the generated query is stored in a table that archives updates based on altered metadata. At 708, the generated query is fired. After the query is fired, the system receives a response which it interprets and renders into visual form in a first part of the Customer Journey in accordance with 710. 712 indicates that the process is routed to end when no new data is needed from the backend server based on changes to the metadata.

Dynamically Resize Journey Diagram Based on Device Size/Screen Size

In order to provide for a straightforward user experience, the User Interface is resized to fit the screen based on the window size of the User Interface and the screen size of the device hosting the User Interface. By adjusting the User Interface to the window size, if the window size is less than the screen size of the device, or to the screen size, if the window size is equal to the screen size, the User Interface provides the largest and most readable version to the user for his review. A larger screen allows the more complex details of the Customer Journey to appear more legible. For example, labels associated with Nodes may be more legible, and contextual data and/or action results in the form of charts or numerical results will be more effectively understood and shared.

In an initial opening of the program, the User Interface expands to the initial window size of the User Interface and renders its components according to the initial window size. As the window size changes, the User Interface renders, again, its components as necessary for the display of the User Interface. Moreover, the User Interface is available for interaction on a variety of devices of different sizes. The User Interface can be installed or run on any of a desktop computer, a laptop, a tablet, a mobile device, or any other device providing a display to a user. Further, the User Interface can be installed or run on any system having either an external apparatus tool for user interaction or a screen tool for user interaction. As an example, the User Interface can be implemented on a desktop in which the user interacts with the User Interface by manipulating an optical mouse. Similarly, the User Interface can be implemented on a mobile device having a touchscreen that the user interacts with according to a finger or a stylus.

To provide the user with the most effective interactivity, the presentation of the User Interface is adapted according to the type of device hosting the User Interface. For example, presentation of the User Interface on a mobile device is not an exact, dimension-locked, replica of the presentation of the User Interface on the desktop computer. Features are readjusted to different portions of the screen to provide maximum legibility and ability to effectuate the presentation of data. On rotatable devices having orientation sensors, the User Interface can be presented in either a landscape mode or a portrait mode. In some embodiments, the User Interface determines the orientation of the device and adapts the presentation of the Customer Journey accordingly.

Figure 8A:
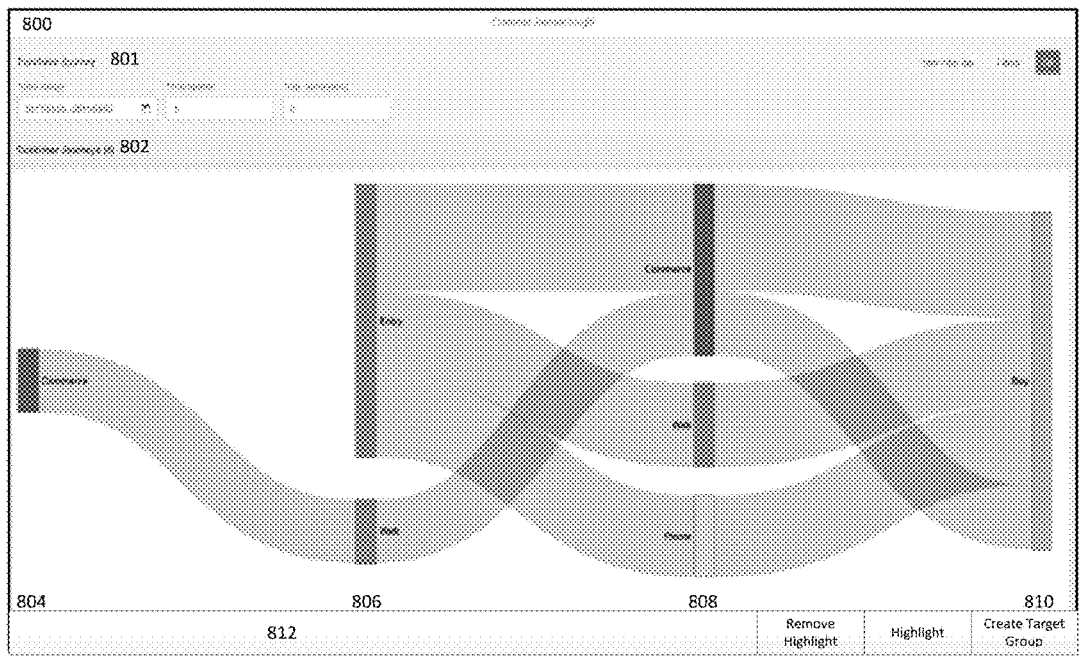
FIG. 8A illustrates a User Interface 800 having a rendered Customer Journey on a full screen of a desktop.

FIG. 8A illustrates a User Interface 800 having a rendered Customer Journey on a full screen of a desktop. In the embodiment shown, the Customer Journey 802 is described as being filtered according to a Purchase Journey 801. The paths of the Customer Journey are provided across four different levels: Level One 804, Level Two 806, Level Three 808, and Level Four 810. On Level One 804, the Customer Journey is provided for Node: Commerce. On Level Two 806, the Customer Journey is provided for several Nodes including: Entry and Web. On Level Three 808, the Customer Journey is provided for several Nodes including: Commerce, Web, and Phone. On Level Four 810, the Customer Journey is provided for Buy. The total number of paths included in the Customer Journey is shown at 802 as 4 paths. To further interact with the Customer Journey, the user may manipulate the dashboard 812. In an example embodiment, the Customer Journey 802 is rendered according to a default presentation setting of the system. As shown, FIG. 8A is provided for a full screen of a desktop or similar device.

Figure 8B:
FIG. 8B illustrates a User Interface 814 having a re-rendered Customer Journey suitable for a smaller resized window.

FIG. 8B illustrates a User Interface 814 having a re-rendered Customer Journey suitable for a smaller resized window. In the embodiment shown, the Customer Journey 816 is described as being filtered according to a Purchase Journey 801. The paths of the Customer Journey are provided across four different levels: Level One 818, Level Two 820, Level Three 822, and Level Four 824. On Level One 818, the Customer Journey is provided for Node: Commerce. On Level Two 820, the Customer Journey is provided for several Nodes including: Entry and Web. On Level Three 822, the Customer Journey is provided for several Nodes including: Commerce, Web, and Phone. On Level Four 824, the Customer Journey is provided for Buy. The total number of paths included in the Customer Journey is shown at 816 as 4 paths. To further interact with the Customer Journey, the user may manipulate the dashboard 826. In an example embodiment, the Customer Journey 816 is rendered after the rendering shown in FIG. 8A. After a widow is resized to be smaller than the original screen size, the presentation available and the Customer Journey must be re-rendered accordingly to fit the window.

Figure 8C:
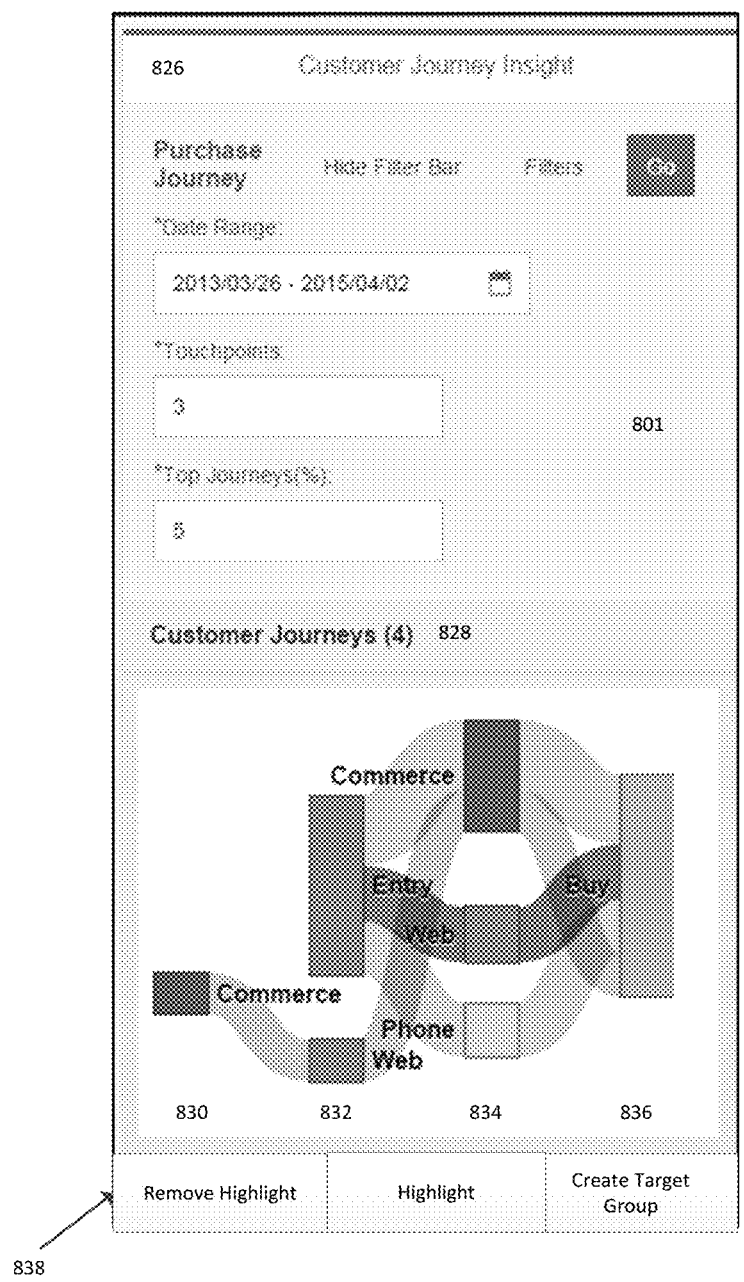
FIG. 8C illustrates a User Interface 826 having a rendered Customer Journey on a mobile device.

FIG. 8C illustrates a User Interface 826 having a rendered Customer Journey on a mobile device. In the embodiment shown, the Customer Journey 828 is described as being filtered according to a Purchase Journey 801. The paths of the Customer Journey are provided across four different levels: Level One 830, Level Two 832, Level Three 834, and Level Four 836. On Level One 830, the Customer Journey is provided for Node: Commerce. On Level Two 832, the Customer Journey is provided for several Nodes including: Entry and Web. On Level Three 834, the Customer Journey is provided for several Nodes including: Commerce, Web, and Phone. On Level Four 836, the Customer Journey is provided for Buy. The total number of paths included in the Customer Journey is shown at 828 as 4 paths. To further interact with the Customer Journey, the user may manipulate the dashboard 838. In an example embodiment, the Customer Journey 828 is rendered according to a default presentation setting of the system. As shown, FIG. 8C is provided for a mobile device or a device having a relatively small screen, such as a tablet.

Figure 9:
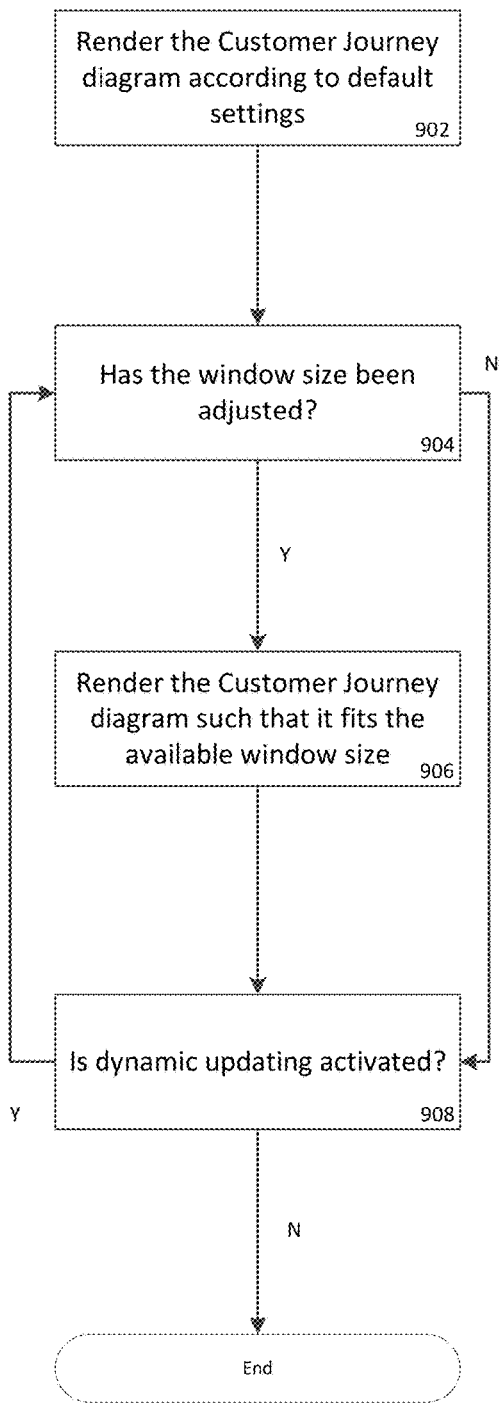
FIG. 9 illustrates a flowchart 900 that describes an example process to resize the User Interface, including a Customer Journey, according to a device screen size.

FIG. 9 illustrates a flowchart 900 that describes an example process to resize the User Interface, including a Customer Journey, according to a device screen size. First, at 902, a Customer Journey diagram is rendered according to default settings, including a default or initial window size of the device hosting the User Interface. In some example embodiments, the default settings are provided for rendering a Customer Journey on a desktop, as shown in FIG. 8A. In other example embodiments, the default settings are provided for rendering a Customer Journey on a smaller device such as a mobile device or a tablet, as shown in FIG. 8C. At 904, it is determined whether the window size of the device has been adjusted. If the window size has been adjusted, the Customer Journey diagram is re-rendered to provide a diagram that fits in the allotted resized space as shown in 906. If the window size has not been adjusted, or upon completion of 906, it is checked in 908 whether the system is set to dynamically update. If not, the process ends. If the method is set to perform dynamic updates, the process cycles back to 904 to continually check whether or not the window size has been adjusted. An example adjustment would be performed to render a resized Customer Journey diagram as shown in FIG. 8B. When the Customer Journey is re-rendered, or rendered, information from a query response related to the relevant data is interpreted before it is rendered. In some example embodiments, the response data is saved locally so that a resize, without any other changes to the metadata (i.e., a filter criteria change), can be addressed as quickly as possible. In other example embodiments, the query is again fired to the backend system requesting information about the relevant data to be displayed in the Customer Journey diagram.

Dynamically Update Journey Based on the Content Repetition

To provide data in a meaningful manner for the user, the diagrams of the Customer Journey include additional features to gain insight into the data set. The diagram can represent the patterns that exist in the overall data set available for the Customer Journey diagrams in a manner that is more intuitive for the user than the raw data in a Customer Journey diagram. In some example embodiments, the Customer Journey diagram is revised, according to at least one rule, to provide a pattern presentation of the Customer Journey diagram. In some example embodiments, the Node and data flow reflect the pattern. A flow quantity is calculated based on the repetition of the content (i.e., frequency) so that the flow quantity reflects the number of times that the same pattern has been detected.

The pattern that is observed for a frequency can be the number of customers. Such a pattern, and its frequency, can be presented in the User Interface as a flow density and an appropriately wide path in the Customer Journey. Other factors can be used to detect a pattern, such as a KPI. In some example embodiments, the Customer Journey diagram is modified according to the frequency of the pattern by emphasizing the most frequent repetitions of the pattern. In other example embodiments, the Customer Journey diagram is modified according to the frequency of the pattern by deemphasizing, or removing, the least frequent repetitions of the pattern.

The user of the system supporting the User Interface can adjust the filter criteria of the system such that only the most frequent, or only the least frequent, patterns are presented for review. In some embodiments, the user identifies the most frequent number of patterns to be presented by modifying a "Top Journeys" field in the filter criteria. In some embodiments, the user identifies the least frequent number of patterns to be presented by modifying a "Bottom Journeys" field in the filter criteria. The data entered into the "Top Journeys" or the "Bottom Journeys" can correspond to an emphasis of the user specified features by removing all other data or by emphasizing, visually, the data meeting the user specified features. In a "Top Journeys" field, a user can select to view only the patterns that rank in the top X % of all of the displayed patterns. For example, if the Customer Journey originally displays 64 patterns and the user sets the "Top Journeys" field to 50%, only the top half of these patterns, or 32 patterns, are displayed in the updated Customer Journey.

The Top Journeys calculation can be performed according to a variety of methods. In an example embodiment, the Top Journeys calculation for the xth pattern is equal to, $F(x)$: $[(R(x)-1)/(N-1)]$. In the example Top Journeys calculation, x is the pattern number, $R(x)$ is the rank of pattern x, and N is the total number of patterns. $F(x)$ provides the percentage of the pattern x from 100%. If four different patterns are included in a set of data: (A) with 100 customers, (B) with 20 customers, (C) with 10 customers, and (D) with 50 customers, the "Top Journeys" calculation can be performed for each of the four different patterns. Pattern A, which has the most customers, has an $R(A)=1$. Pattern D, which has the second largest number of customers, has an $R(D)=2$. Pattern B has an $R(B)=3$. Pattern C has an $R(C)=4$. As there are four patterns available for the Customer Journey, $N=4$. Therefore: $F(A)=0\%$; $F(B)=66.67\%$; $F(C)=100\%$; and $F(D)=33.33\%$. Therefore, if the user selects a Top Journeys value of 70%, all of the patterns from pattern A, pattern D, and pattern B are eligible for inclusion in the presented results.

Figure 10A:
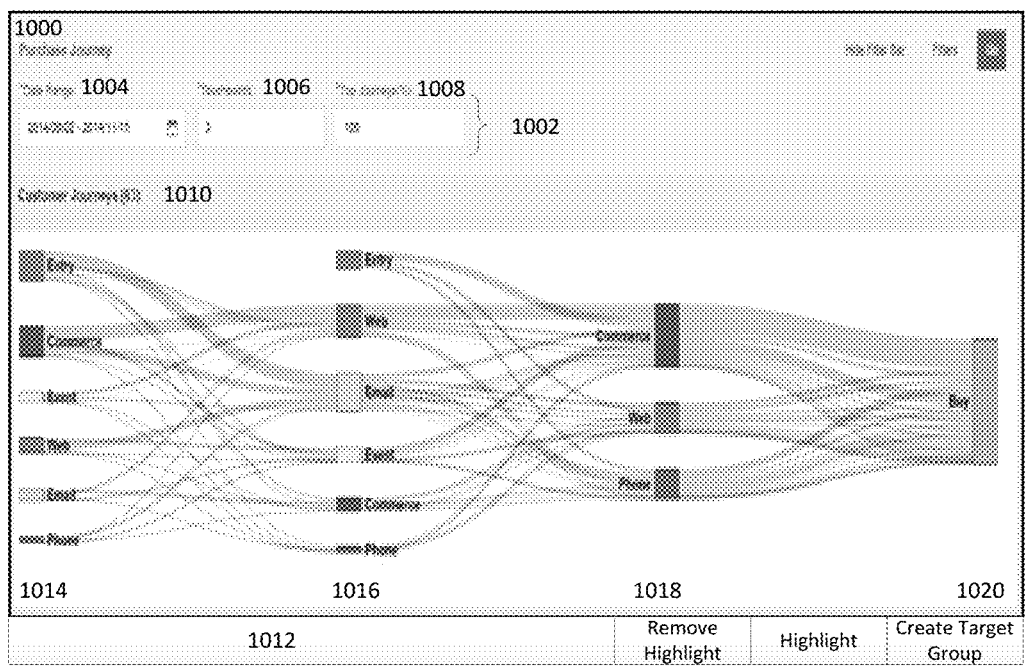
FIG. 10A illustrates a User Interface 1000 having an example Customer Journey diagram that allows for users to view repeating content.

FIG. 10A illustrates a User Interface 1000 having an example Customer Journey diagram that allows for users to view repeating content. In the embodiment shown, the Customer Journey 1010 is described as being filtered according to a Purchase Journey Criteria 1002 including: Date Range 1004, Touchpoints 1006, and Top Journeys 1008. Touchpoints refers to the number of Nodes that the user wishes to view. In some example embodiments, the touchpoints refers to the most recent touchpoints and therefore if the numerical value was "3", the Customer Journey 1010 would include the most recent three interactions for the available paths. Top Journeys is described in greater detail in the foregoing.

The paths of the Customer Journey are provided across four different levels: Level One 1014, Level Two 1016, Level Three 1018, and Level Four 1020. On Level One 1014, the Customer Journey is provided for several Nodes: Entry, Commerce, Event, Web, Email, and Phone. On Level Two 1016, the Customer Journey is provided for several Nodes including: Entry, Web, Email, Event, Commerce, and Phone. On Level Three 1018, the Customer Journey is provided for several Nodes including: Commerce, Web, and Phone. On Level Four 1020, the Customer Journey is provided for Buy. The total number of paths included in the Customer Journey is shown at 1010 as 63 paths. To further interact with the Customer Journey, the user may manipulate the dashboard 1012. In the example embodiment shown in FIG. 10A, the value 100 populates the filter criteria Top Journeys 108. Therefore, all of the available paths, meaning all of the 100% most traveled paths, are displayed to the user.

Figure 10B:
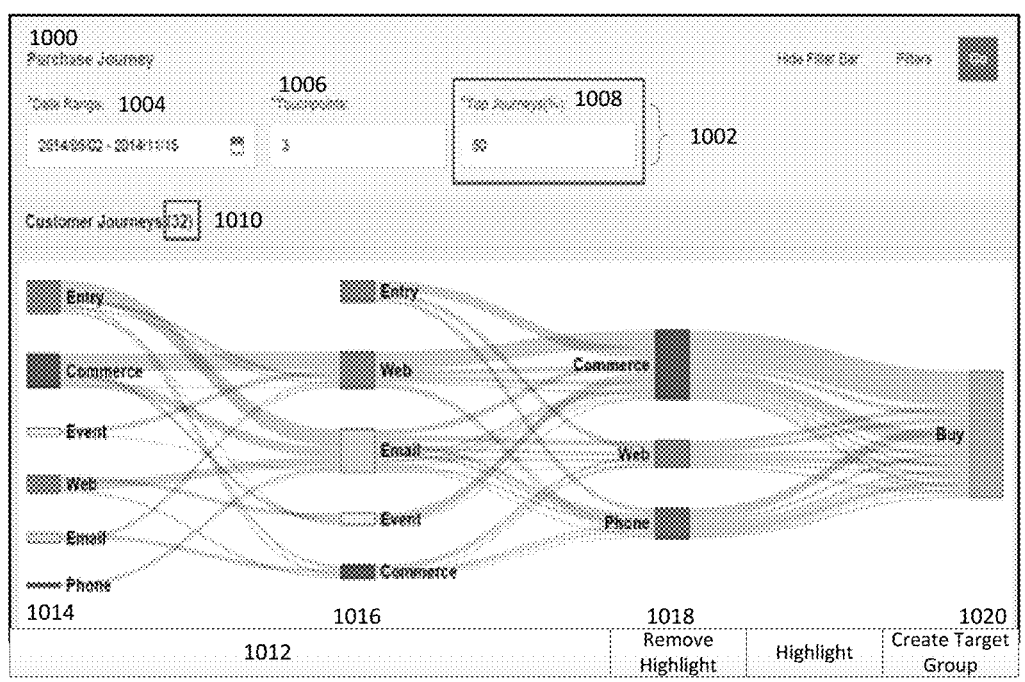
FIG. 10B illustrates a User Interface 1000 having another example Customer Journey diagram that allows for users to view repeating content.

FIG. 10B illustrates a User Interface 1000 having another example Customer Journey diagram that allows for users to view repeating content. In the embodiment shown, the Customer Journey 1010 is described as being filtered according to a Purchase Journey Criteria 1002 including: Date Range 1004, Touchpoints 1006, and Top Journeys 1008. In the example embodiment shown in FIG. 10B, the user has entered the value 50% into Top Journeys 1008. Therefore, only the available paths that are in the top 50% of all available paths are displayed to the user. As shown in 1010, this results in the display of 32 paths in the Customer Journey diagram. In FIG. 10B, these 32 paths represent the paths that are ranked as repeating more than the other half of the paths, 31, which are not displayed to the user.

Figure 10C:
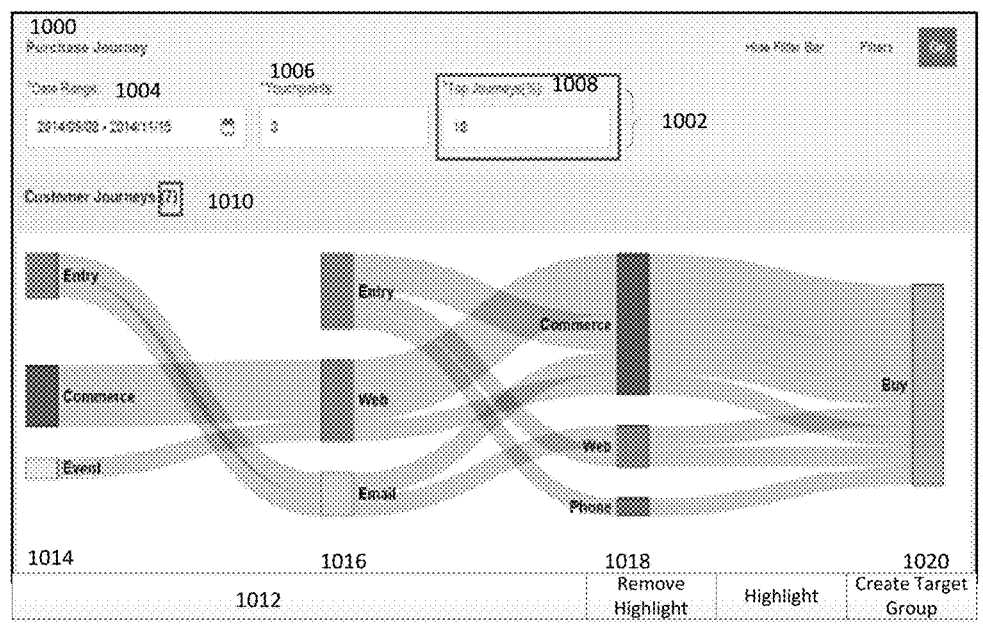
FIG. 10C illustrates a User Interface 1000 having another example Customer Journey diagram that allows for users to view repeating content.

FIG. 10C illustrates a User Interface 1000 having another example Customer Journey diagram that allows for users to view repeating content. In the embodiment shown, the Customer Journey 1010 is described as being filtered according to a Purchase Journey Criteria 1002 including: Date Range 1004, Touchpoints 1006, and Top Journeys 1008. In the example embodiment shown in FIG. 10B, the user has entered the value 10% into Top Journeys 1008. Therefore, only the available paths that are in the top 10% of all available paths are displayed to the user. As shown in 1010, this results in the display of 7 paths in the Customer Journey diagram. In FIG. 10C, these 7 paths represent the paths that are ranked as repeating more than the other 90% of the paths. The 56 other paths that fall into the 90% are not displayed to the user.

Figure 11:
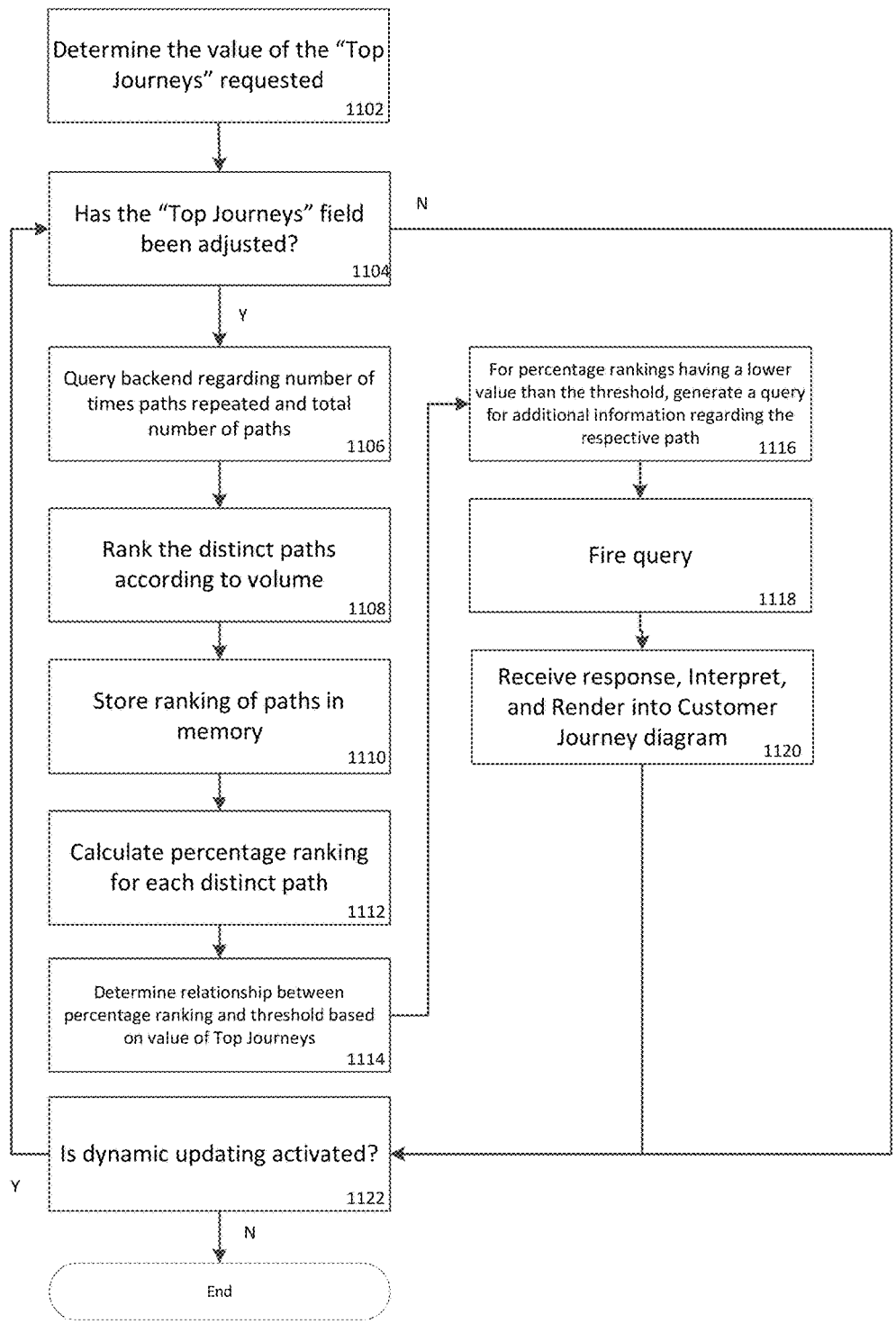
FIG. 11 illustrates a flowchart 1100 that describes an example process to update a Customer Journey in a User Interface according to repeating content.

FIG. 11 illustrates a flowchart 1100 that describes an example process to update a Customer Journey in a User Interface according to repeating content. In 1102, the process begins by determining the value of the "Top Journeys" requested by the user. In 1104, it is determined whether or not the user has updated the "Top Journeys" field. In 1106, the system queries, according to the other relevant filter criteria, the: number of times each distinct path is repeated and the total number of distinct paths. In 1108, the paths are ranked from 1 to the total number of distinct paths according to the number of times that the paths are repeated. In 1110, the ranking of the paths is stored in a Dynamic Ranking Table. In 1112, the percentage ranking of each distinct pattern is calculated. The percentage ranking is calculated, for each distinct path or pattern, by: subtracting 1 from the ranking, and dividing the result by total number of patterns minus 1. As shown in the foregoing, a representative equation is: F(x): [(R(x)−1)/(N−1)]. In 1112, the percentage ranking of the paths is stored in the Dynamic Ranking Table. In 1114, it is determined whether, for each path, the percentage ranking is lower than the requested value. In some embodiments, when the Bottom Journeys are requested, then it is determined whether, for each path, the percentage ranking is higher than the requested value. If, for the Top Journeys, the percentage ranking is lower than the user requested value, that corresponding path is identified and a query is generated in 1116. In 1118, a query is sent to the backend requesting information regarding the identified path. The response to the query is interpreted and rendered into visual data in the form of a Customer Journey in 1120. If the method is set to perform dynamic updates, which is checked in 1122, the process cycles back to 1104 to continually check whether or not the user has altered the requested Top Journeys.

The Top Journeys calculation can be performed according to a variety of methods. In an example embodiment, the Top Journeys calculation for the xth pattern is equal to, F(x): [(R(x)−1)/(N−1)]. In the example Top Journeys calculation, x is the pattern number, R(x) is the rank of pattern x, and N is the total number of patterns. F(x) provides the percentage of the pattern x from 100%. If four different patterns are included in a set of data: (A) with 100 customers, (B) with 20 customers, (C) with 10 customers, and (D) with 50 customers, the "Top Journeys" calculation can be performed for each of the four different patterns. Pattern A, which has the most customers, has an R(A)=1. Pattern D, which has the second largest number of customers, has an R(D)=2. Pattern B has an R(B)=3. Pattern C has an R(C)=4. As there are four patterns available for the Customer Journey, N=4. Therefore: F(A)=0%; F(B)=66.67%; F(C)=100%; and F(D)=33.33%. Therefore, if the user selects a Top Journeys value of 70%, all of the patterns from pattern A, pattern D, and pattern B are eligible for inclusion in the presented results.

Identification of Patterns as Focus Points of Journey

In order to assist a user identify trends in the data presented in the Customer Journey diagram, the invention further provides support in decoding trends before or after a user specified target event. The user therefore provides the system with the details of the specified target event, and accordingly, the User Interface identifies paths in the Customer Journey meeting the criteria of the specified target event. The identified paths are returned, via an illustration in the Customer Journey diagram, to the user for review.

As an example, a user may be concerned with specific steps or events that occur before or after a path has a sequence that includes a purchase, a customer service call, and a return. By providing that particular sequence including the purchase, the customer service call, and the return as the criteria for the specified target event, the total data presented in the Customer Journey diagram is limited to the paths meeting the criteria. The user can thereafter visually, and with the assistance of contextual data and/or actions, review the returned data. By identifying the paths with this particular sequence, the user can determine whether there was any other action taken, after the return of the item. For example, a single customer that makes another purchase, after the return, might simply have not found the product useful. However, a large number of customers making another purchase after the return could imply any number of issues such as: product misrepresentation, product failure, or customer service failure. The data from after the return could be further useful in resolving that unknown issue if, for example, the product purchased afterwards was generally a similar product by a large number of users. Similarly, the user can determine whether there was any other action taken prior to the return of the item. For example, a single customer could be identified as a customer that periodically returns items after purchase. In these circumstances, the user could determine whether the customer was engaging in a fraud on the business. Provided the breadth of the possible circumstances depending on the business context and the types of event sequences that are able to be identified, any similar identifications and analyses should be considered incorporated herein.

Figure 12A:
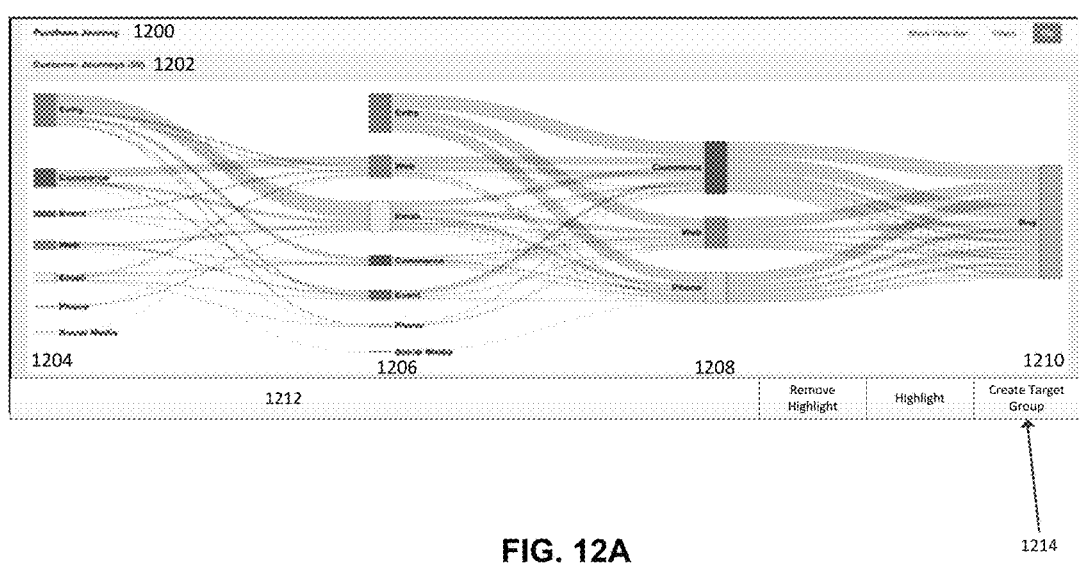
FIG. 12A is an illustration of a Customer Journey 1200 that, according to an example embodiment, identifies and presents information regarding a Target Group.

FIG. 12A is an illustration of a Customer Journey 1200 that can identify and present information regarding a Target Group. The diagram of the Customer Journey provides the interaction of various customers over four different levels: Level One 1204, Level Two 1206, Level Three 1208, and Level Four 1210. On Level One 1204, the Customer Journey is provided for several Nodes including: Entry, Commerce, Event, Web, Email, Phone, and Social Media. On Level Two 1206, the Customer Journey is provided for several Nodes including: Entry, Web, Email, Commerce, Event, Phone, and Social Media. On Level Three 1208, the Customer Journey is provided for Commerce, Web, and Phone. On Level Four 1210, the Customer Journey is provided for Buy. The total number of paths included in the Customer Journey is shown at 1202 as 50 paths. To further interact with the Customer Journey, the user may manipulate the dashboard 1212. In an example embodiment, the Customer Journey 1202 is rendered according to a default presentation setting of the system. As shown, in FIG. 12A, the Customer Journey further includes an option 1214 to "Create Target Group." A Target Group can include a series of Nodes of interest to a user, which may be called an "input sequence". In an example embodiment, the Target Group includes at least two Nodes that are adjacent to one another in a path. In another example embodiment, the Target Group includes at least two Nodes that may be separated from one another by a user specified number of Nodes. In some embodiments, the user specified number of Nodes for the separation is a maximum number of Nodes of separation. In some example embodiments, a Target Group can be created and saved by the user.

Figure 12B:
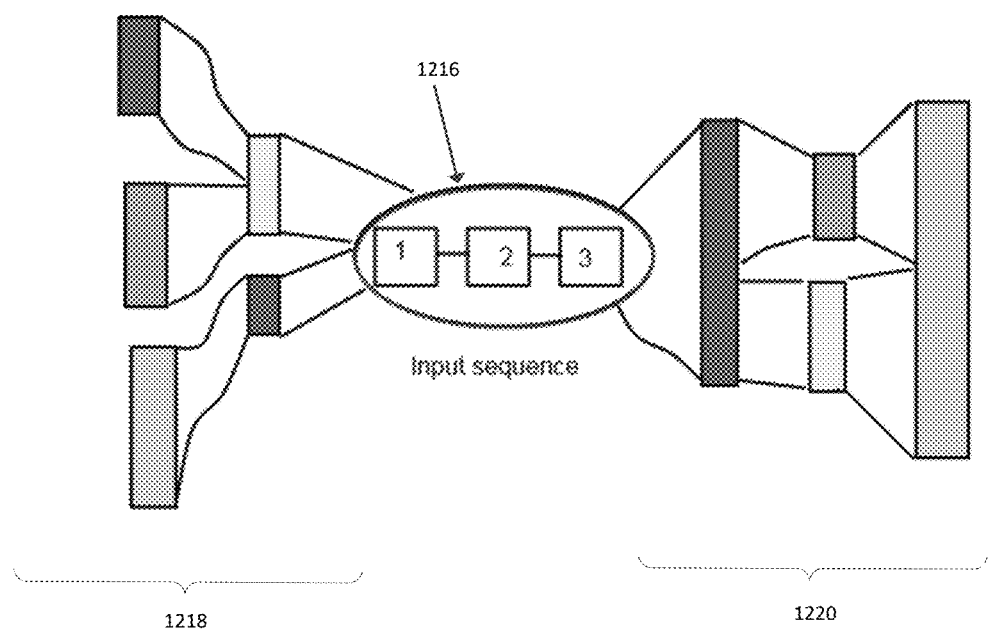
FIG. 12B is an illustration of a Customer Journey 1202 that, according to an example embodiment, has identified and presented information regarding a Target Group.

FIG. 12B is an illustration of a Customer Journey 1202 that according to an example embodiment has identified and presented information regarding a Target Group. The diagram of the Customer Journey 1202 provides the paths including the input sequence, or Target Group, 1216 specified by the user in response to the "Create Target Group" selection performed by the user in FIG. 12A. In some example embodiments, the Customer Journey 1202 further displays Nodes 1218 in the diagram that occurred prior to the identified Target Group 1216. In some example embodiments, the Customer Journey 1202 further displays Nodes 1220 in the diagram that occurred at a point in time after the identified Target Group 1216. In some embodiments, as is the case in FIG. 12B, both prior Nodes 1218 and post Nodes 1220 are displayed in the Customer Journey 1202.

Figure 13:
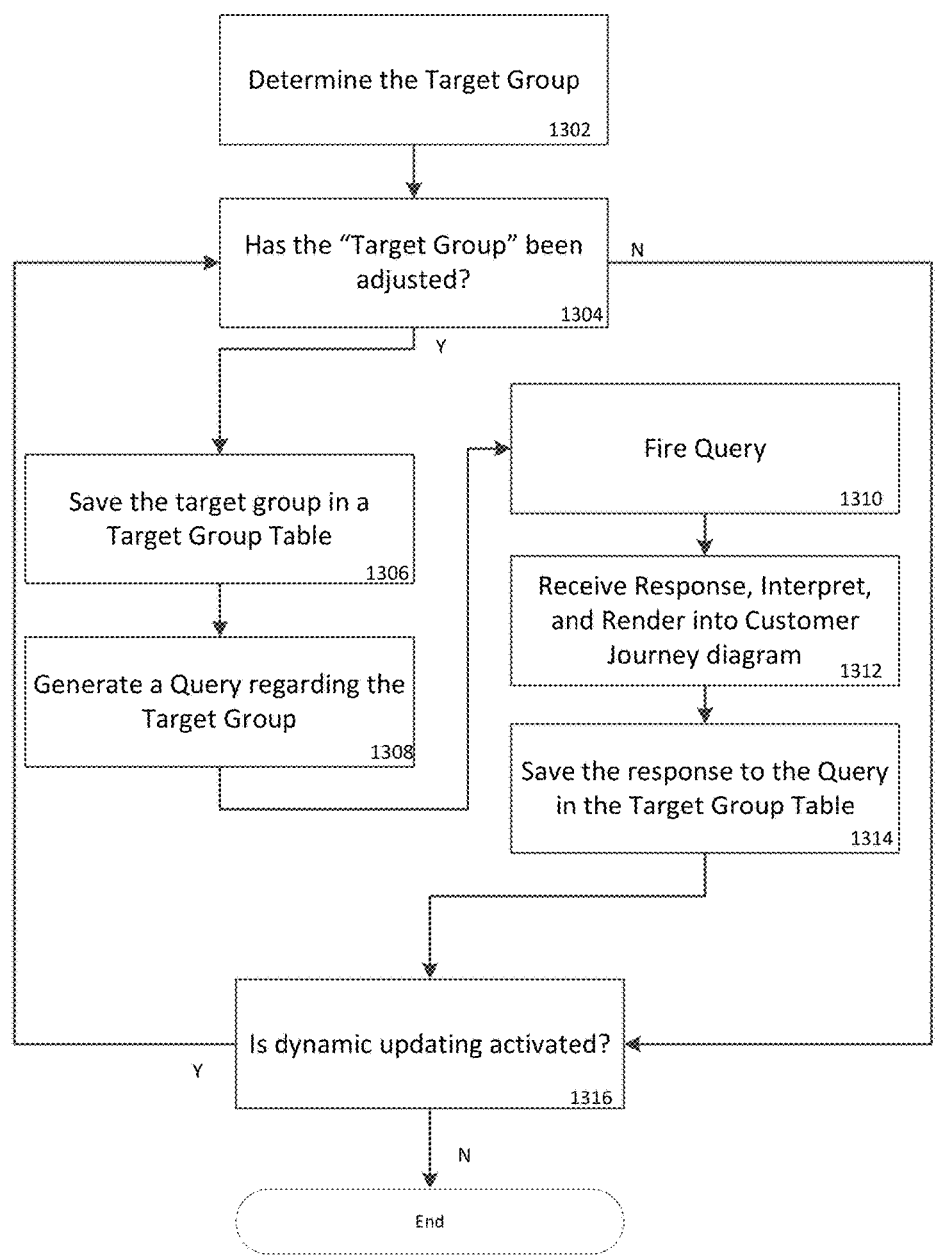
FIG. 13 is a flowchart 1300 that describes an example process to identify a Target Group in a Customer Journey diagram and present information regarding the Target Group.

FIG. 13 is a flowchart 1300 that describes an example process to identify a Target Group in a Customer Journey diagram and present information regarding the Target Group. In 1302, the process begins by determining the "Target Group" requested by the user. In 1304, it is determined whether or not the user "Target Group" field has been adjusted. Optionally, if the Target Group has been adjusted, in 1306, the Target Group is saved in a Target Group Table. In 1308, the system generates a query regarding the Target Group. Following the generation of the query, the query is fired in 1310. The response to the query is interpreted and rendered into visual data in the form of a Customer Journey in 1312. Optionally, in 1314, the response to the Query is saved in the Target Group Table. If the method is set to perform dynamic updates, which is checked in 1316, the process cycles back to 1304 to continually check whether or not the user has altered the requested Top Journeys.

It should be appreciated that the present invention can be implemented in numerous ways, including as a process, an apparatus, a system, a computer processor executing software instructions, or a computer readable medium such as a non-transitory computer readable storage medium, or a computer Network wherein program instructions are sent over optical or electronic communication or non-transitory links. It should be noted that the order of the steps of disclosed processes can be altered within the scope of the invention, as noted in the appended claims and in the description herein.

Although the foregoing invention has been described in some detail for purposes of clarity of understanding, it will be apparent that certain changes and modifications can be practiced within the scope of the appended claims. The present invention can be practiced according to the claims and/or the embodiments without some or all of these specific details. Portions of the embodiments described herein can be used with or without each other and can be practiced in conjunction with a subset of all of the described embodiments. For the purpose of clarity, technical material that is known in the technical fields related to the invention has not been described in detail so that the present invention is not unnecessarily obscured.

It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A system for updating a journey shown in a Sankey diagram to a new journey in a new Sankey diagram rendered in a graphical user interface, the system comprising:
    a server configured to:
        host data related to habits of a plurality of customers and related to at least one relationship between the habits of the plurality of customers,
        accumulate, at predefined intervals, new data related to the habits of the plurality of customers and incorporate the new data into the hosted data, and
        process a query by retrieving a subset of the hosted data related to the query and returning the retrieved subset of the hosted data as a response; and
    a user device including:
        a processor configured to:
            transmit queries to the server and receive responses to such queries;
            recognize that the journey in the Sankey diagram must be updated based on a requested change in visualization data,
            collect the visualization data related to the change,
            form the query according to the collected visualization data and query the server, and
            render, in the graphical user interface, information as the new journey in the new Sankey diagram based on the response from the server, and
        a display device configured to:
            render the graphical user interface in response to the queries;
            receive, via user-generated input via the graphical user interface, a request for a change in the visualization data, and
            display, in the graphical user interface, the rendered information as the new journey in the new Sankey diagram, wherein the journey includes at least one link that forms a path between at least two nodes;
    wherein the requested change in visualization data is triggered by a revised entry in a top journeys criteria;
    wherein a top journeys calculation for an xth pattern is equal to $F(x): [(R(x)-1)/(N-1)]$, wherein x is a pattern number, $R(x)$ is a rank of pattern x, and N is a total number of patterns;
    wherein the requested change in visualization data is triggered by a resizing of a window on a device displaying the journey.

2. The system as recited in claim 1, wherein the requested change in visualization data is further triggered by a user selection on a mini map of the journey.

3. The system as recited in claim 2, wherein the mini map of the journey is a complete representation of the journey over time with respect to one of a purchase or a KPI.

4. The system as recited in claim 2, wherein the requested change in visualization data is further triggered by a change in required metadata for the journey prompted according to at least one of: a user selection and the new data related to the habits of the plurality of customers.

5. The system as recited in claim 1, wherein the requested change in visualization data is further triggered by creation of a target group.

6. The system as recited in claim 5, wherein the collected visualization data includes a sequence of nodes identified by a user as the target group, and wherein the query requests the new journey to include all paths including the sequence of nodes.

7. A method for updating a journey shown in a Sankey diagram to a new journey in a new Sankey diagram rendered in a graphical user interface, the method being implemented by one or more computers and comprising:
    receiving, by a server from a user device, a query derived from a requested change in visualization data, the requested change being based on user-generated input received via the graphical user interface;
    retrieving, from the server hosting data related to habits of a plurality of customers and related to at least one relationship between the habits of the plurality of customers, a subset of the hosted data related to the query, the server accumulating, at predefined intervals, new data related to the habits of the plurality of customers and incorporate the new data into the hosted data, and
    returning, by the server, the retrieved subset of the hosted data to the user device;
    wherein the user device includes a processor configured to:
        transmit queries to the server and receive responses to such queries;
        recognize that the journey in the Sankey diagram must be updated based on a requested change in visualization data,
        collect the visualization data related to the change,
        form the query according to the collected visualization data and query the server, and
        render, in the graphical user interface, information as the new journey in the new Sankey diagram based on the response from the server, and cause a display device to
    render the graphical user interface in response to the queries;
    receive, via user-generated input via the graphical user interface a request for a change in the visualization data, and
    display, in the graphical user interface, the rendered information as the new journey in the new Sankey diagram, wherein the journey includes at least one link that forms a path between at least two nodes;
wherein the requested change in visualization data is triggered by a revised entry in a top journeys criteria;
wherein a top journeys calculation for an xth pattern is equal to F(x): [(R(x)−1)/(N−1)], wherein x is a pattern number, R(x) is a rank of pattern x, and N is a total number of patterns;
wherein the requested change in visualization data is triggered bya resizing of a window on a device displaying the journey.

8. The method as recited in claim 7, wherein the requested change in visualization data is further triggered by a user selection on a mini map of the journey.

9. The method as recited in claim 7, wherein the mini map of the journey is a complete representation of the journey over time with respect to one of a purchase or a KPI.

10. The method as recited in claim 8, wherein the requested change in visualization data is further triggered bya change in required metadata for the journey prompted according to at least one of: a user selection and the new data related to the habits of the plurality of customers.

11. The method as recited in claim 7, wherein the requested change in visualization data is triggered by a resizing of a window on a device displaying the journey.

12. The method as recited in claim 7, wherein the requested change in visualization data is further triggered by creation of a target group.

13. The method as recited in claim 12, wherein the collected visualization data includes a sequence of nodes identified by a user as the target group, and wherein the query requests the new journey to include all paths including the sequence of nodes.

14. A computer program product for updating a journey shown in a Sankey diagram to a new journey in a new Sankey diagram rendered in a graphical user interface, the computer program product comprising non-transitory media storing instructions which, when executed by at least one data processor, result in operations comprising:
    receiving, by a server from a user device, a query derived from a requested change in visualization data, the requested change being based on user-generated input received via the graphical user interface;
    retrieving, from the server hosting data related to habits of a plurality of customers and related to at least one relationship between the habits of the plurality of customers, a subset of the hosted data related to the query, the server accumulating, at predefined intervals, new data related to the habits of the plurality of customers and incorporate the new data into the hosted data, and
    returning, by the server, the retrieved subset of the hosted data to the user device;
    wherein the user device includes a processor configured to:
        transmit queries to the server and receive responses to such queries;
        recognize that the journey in the Sankey diagram must be updated based on a requested change in visualization data,
        collect the visualization data related to the change,
        form the query according to the collected visualization data and query the server, and
        render, in the graphical user interface, information as the new journey in the new Sankey diagram based on the response from the server, and
        cause a display device to
            render the graphical user interface in response to the queries;
            receive, via user-generated input via the graphical user interface, a request for a change in the visualization data, and
            display, in the graphical user interface, the rendered information as the new journey in the new Sankey diagram, wherein the journey includes at least one link that forms a path between at least two nodes;
    wherein the requested change in visualization data is triggered bya revised entry in a top journeys criteria;
    wherein a top journeys calculation for an xth pattern is equal to F(x): [(R(x)−1)/(N−1)], wherein x is a pattern number, R(x) is a rank of pattern x, and N is a total number of patterns;
    wherein the requested change in visualization data is triggered bya resizing of a window on a device displaying the journey.

15. The computer program product as recited in claim 14, wherein the requested change in visualization data is further triggered by a user selection on a mini nna p of the journey.

16. The computer program product as recited in claim 15, wherein the mini map of the journey is a complete representation of the journey over time with respect to one of a purchase or a KPI.

17. The computer program product as recited in claim 16, wherein the requested change in visualization data is further triggered by a change in required metadata for the journey prompted according to at least one of: a user selection and the new data related to the habits of the plurality of customers.

18. The computer program product as recited in claim 14, wherein the requested change in visualization data is triggered by a resizing of a window on a device displaying the journey.

19. The computer program product as recited in claim 14, wherein:
    the requested change in visualization data is further triggered by creation of a target group; and
    the collected visualization data includes a sequence of nodes identified by a user as the target group, and wherein the query requests the new journey to include all paths including the sequence of nodes.

* * * * *